(12) United States Patent
Kohiyama et al.

(10) Patent No.: US 8,984,272 B2
(45) Date of Patent: Mar. 17, 2015

(54) INFORMATION PROCESSING APPARATUS, SECURE MODULE, INFORMATION PROCESSING METHOD, AND COMPUTER PRODUCT

(75) Inventors: Kiyoshi Kohiyama, Kawasaki (JP);
Masakazu Takakusu, Yokohama (JP);
Kenichi Wakasugi, Yokohama (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/434,611

(22) Filed: Mar. 29, 2012

(65) Prior Publication Data

US 2012/0278608 A1 Nov. 1, 2012

(30) Foreign Application Priority Data

Apr. 28, 2011 (JP) ................... 2011-102491

(51) Int. Cl.
*G06F 21/00* (2013.01)
*G06F 21/57* (2013.01)
*G06F 21/54* (2013.01)
(Continued)

(52) U.S. Cl.
CPC ............... *G06F 21/57* (2013.01); *G06F 21/54* (2013.01); *G06F 21/554* (2013.01); *G06F 21/602* (2013.01); *G06F 21/629* (2013.01); *G06F 21/71* (2013.01); *G06F 21/72* (2013.01); *G06F 21/86* (2013.01); *G06F 2221/033* (2013.01);
(Continued)

(58) Field of Classification Search
USPC ........................................................ 713/150
See application file for complete search history.

(56) References Cited

U.S. PATENT DOCUMENTS

| 4,459,664 A * | 7/1984 | Pottier et al. .................. 718/105 |
| 5,058,162 A | 10/1991 | Santon et al. |

(Continued)

FOREIGN PATENT DOCUMENTS

| CN | 1871568 B | 4/2010 |
| JP | 2000-155819 A | 6/2000 |

(Continued)

OTHER PUBLICATIONS

European Search Report dated Apr. 14, 2014.

(Continued)

*Primary Examiner* — Morshed Mehedi
(74) *Attorney, Agent, or Firm* — Arent Fox LLP

(57) ABSTRACT

An information processing apparatus securely stores a program group comprising one or more programs and includes a first detector that detects an execution waiting state of a given program among the program group; a secure module that is configured such that information stored therein cannot be referred to by an external device, and when the execution waiting state is detected by the first detector, that encrypts the given program and writes the encrypted given program to a storage area that is different from that of the program group; a second detector that detects an execution request concerning the given program; a decrypter that decrypts the given program encrypted by the secure module and writes the decrypted given program to the storage area, when the execution request concerning the given program is detected by the second detector; and a program executor that executes the given program decrypted by the decrypter.

21 Claims, 22 Drawing Sheets

(51) Int. Cl.
*G06F 21/55* (2013.01)
*G06F 21/60* (2013.01)
*G06F 21/62* (2013.01)
*G06F 21/71* (2013.01)
*G06F 21/72* (2013.01)
*G06F 21/86* (2013.01)

(52) U.S. Cl.
CPC . *G06F2221/2101* (2013.01); *G06F 2221/2143* (2013.01); *G06F 2221/2107* (2013.01)
USPC .............. 713/150; 726/11; 726/22; 713/187; 713/189; 380/277

(56) References Cited

U.S. PATENT DOCUMENTS

| | | | |
|---|---|---|---|
| 5,915,025 A | | 6/1999 | Taguchi et al. |
| 2003/0126457 A1* | | 7/2003 | Kohiyama et al. ............. 713/193 |
| 2004/0039944 A1* | | 2/2004 | Karasaki .................... 713/201 |
| 2004/0139347 A1* | | 7/2004 | Sakaguchi ................... 713/200 |
| 2005/0097524 A1* | | 5/2005 | Hasegawa et al. ............ 717/136 |
| 2006/0126849 A1* | | 6/2006 | Shirakawa et al. ............ 380/277 |
| 2006/0294369 A1 | | 12/2006 | Matsushima et al. |
| 2007/0113079 A1* | | 5/2007 | Ito et al. ....................... 713/166 |
| 2008/0072332 A1* | | 3/2008 | Kohiyama et al. .............. 726/26 |
| 2008/0141045 A1* | | 6/2008 | Abiko et al. .................. 713/193 |
| 2008/0201414 A1* | | 8/2008 | Amir Husain et al. ....... 709/203 |
| 2009/0006864 A1* | | 1/2009 | Hashimoto et al. ........... 713/190 |
| 2009/0031141 A1* | | 1/2009 | Pearson et al. ................ 713/187 |
| 2009/0070599 A1* | | 3/2009 | Nishimura et al. ........... 713/193 |
| 2010/0037066 A1* | | 2/2010 | Miyabe ........................ 713/189 |
| 2011/0010709 A1* | | 1/2011 | Anand et al. ..................... 718/1 |

FOREIGN PATENT DOCUMENTS

| | | |
|---|---|---|
| JP | 2004-129227 A | 4/2004 |
| JP | 2005-071055 A | 3/2005 |
| JP | 2010-039576 A | 2/2010 |
| JP | 4408601 B2 | 2/2010 |
| WO | WO 2005/098570 A1 | 10/2005 |

OTHER PUBLICATIONS

Chinese Office Action issued Jul. 15, 2014; Application No. 201210114118.8, with English Translation.
Japanese Office Action issued Nov. 4, 2014; Japanese Application No. 2011-102491, with partial English Translation.
Japenese Office Action issued on Jan. 27, 2015, for the corresponding Japanese Patent Application No. 2011-102491.

* cited by examiner

FIG.21

| ADDRESS | CONTENTS |
|---|---|
| 1 | READ "ENCRYPTION KEY" to zz |
| 2 | yy=x4 |
| 3 | yy=yy+1 |
| 4 | if yy > x100 jump to x5 |
| 5 | READ "yy" to xx |
| 6 | ww=xx XOR zz |
| 7 | WRITE ww to "yy" |
| 8 | jump to 3 |
| ⋮ | ⋮ |
| x5 | ENCRYPTED COMMAND |
| x6 | ENCRYPTED COMMAND |
| ⋮ | ⋮ |
| x100 | ENCRYPTED COMMAND |
| ⋮ | ⋮ |

US 8,984,272 B2

INFORMATION PROCESSING APPARATUS, SECURE MODULE, INFORMATION PROCESSING METHOD, AND COMPUTER PRODUCT

CROSS REFERENCE TO RELATED APPLICATIONS

This application is based upon and claims the benefit of priority of the prior Japanese Patent Application No. 2011-102491, filed on Apr. 28, 2011, the entire contents of which are incorporated herein by reference.

FIELD

The embodiments discussed herein are related to an information processing apparatus, a secure module, an information processing method, and computer product.

BACKGROUND

Conventionally, mobile terminals (hereinafter, "terminal") do not assume third party software development and consequently, terminal specifications and software configuration are not openly known, affording confidentiality and considerable security of the internal workings of the terminal. Further, as a strategy for authenticity, secure modules (tamper-proof modules, e.g., Subscriber Identity Module Card (SIM)), which assure security, have guaranteed the security of information that must be kept confidential (e.g., encryption keys, user identification information) (for example, refer to Japanese Laid-Open Patent Publication No. 2004-129227 and Japanese Patent No. 4408601).

In other words, information that must be kept confidential can only be used by authentic internal software of the terminal. Consequently, based on whether communication contents received from a terminal have been encrypted using an authentic encryption key guaranteeing security, whether the received contents include user identification information guaranteeing security, etc., an external apparatus can determine whether communication contents are authentic, thereby guaranteeing security.

However, as seen with smart phones, in recent years there has been a shift to disclose terminal specifications and software configuration, which is accompanied by the advancement of third-party software development. As a result, the potential of internal terminal software being read, analyzed, and tampered with by crackers, leading to the development of malicious software is increasing. Further, with secure modules, although third-parties cannot see or tamper with such information, the interfaces for using the device via software are being disclosed. As a result, this information, which must be kept confidential, can be easily read out from the secure module by malicious software.

Consequently, after encrypting fraudulent communication contents using an authentic encryption key or including user information in fraudulent communication contents, malicious software can transmit the fraudulent communication contents to an external apparatus. Thus, the external apparatus cannot determine whether the communication contents are fraudulent, arising in a problem that the authenticity of the communication cannot be guaranteed.

SUMMARY

According to an aspect of an embodiment, an information processing apparatus securely stores a program group of one or more programs. The information processing apparatus includes a first detector that detects an execution waiting state of a given program among the program group; a secure module that is configured such that information stored therein cannot be referred to by an external device, and when the execution waiting state is detected by the first detector, that encrypts the given program and writes the encrypted given program to a storage area that is different from that of the program group; a second detector that detects an execution request concerning the given program; a decrypter that decrypts the given program encrypted by the secure module and writes the decrypted given program to the storage area, when the execution request concerning the given program is detected by the second detector; and a program executor that executes the given program decrypted by the decrypter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a diagram of an example of a program that executes the descrambling process.

DESCRIPTION OF EMBODIMENTS

Preferred embodiments of the present invention will be explained with reference to the accompanying drawings. To make the period that a non-encrypted program resides in memory for which security is not guaranteed as short as possible, in the present embodiment, an information processing apparatus encrypts the program, which is to be written to memory for which security is not guaranteed, and after encrypting the program at a secure module for which authenticity is guaranteed, writes the program to the memory. As a result, since the program is in an encrypted state while in the memory prior to execution, the security of the program in the memory is guaranteed, thereby enabling analysis and tampering of the program by a cracker to be prevented.

Further, the information processing apparatus decrypts the encrypted program written to the memory only when the program is to be executed, and when the execution of the program has been completed, the information processing apparatus deletes the program. As a result, the information processing apparatus reduces the time that the program in a non-encrypted state resides in the memory, thereby preventing analysis and tampering of the program by a cracker.

Figure 1A:
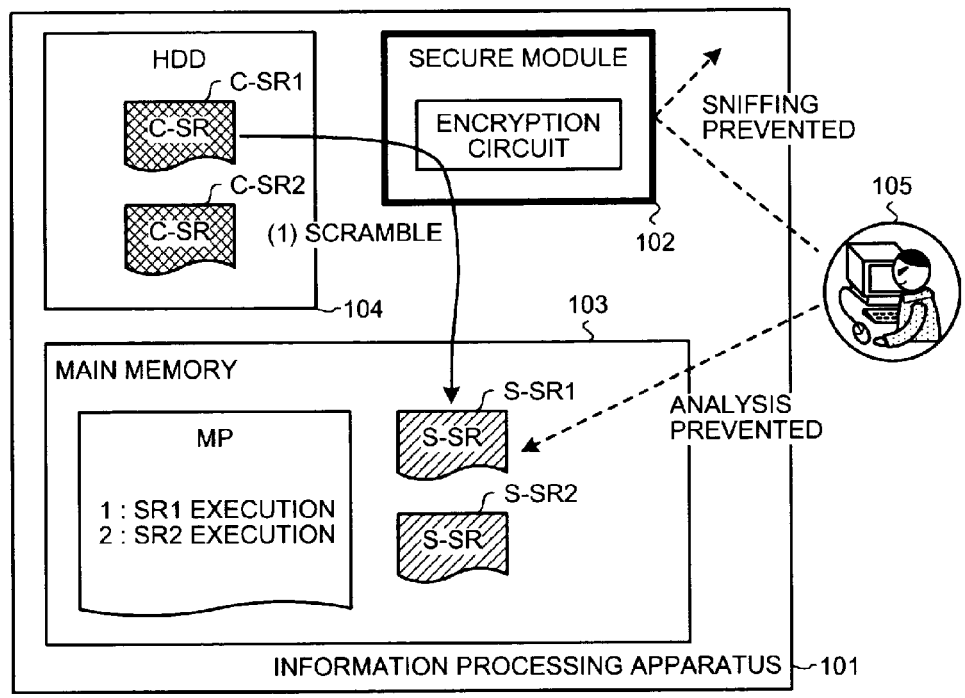
FIGS. 1A and 1B are diagrams depicting program tampering prevention by an information processing apparatus.
Figure 1B:
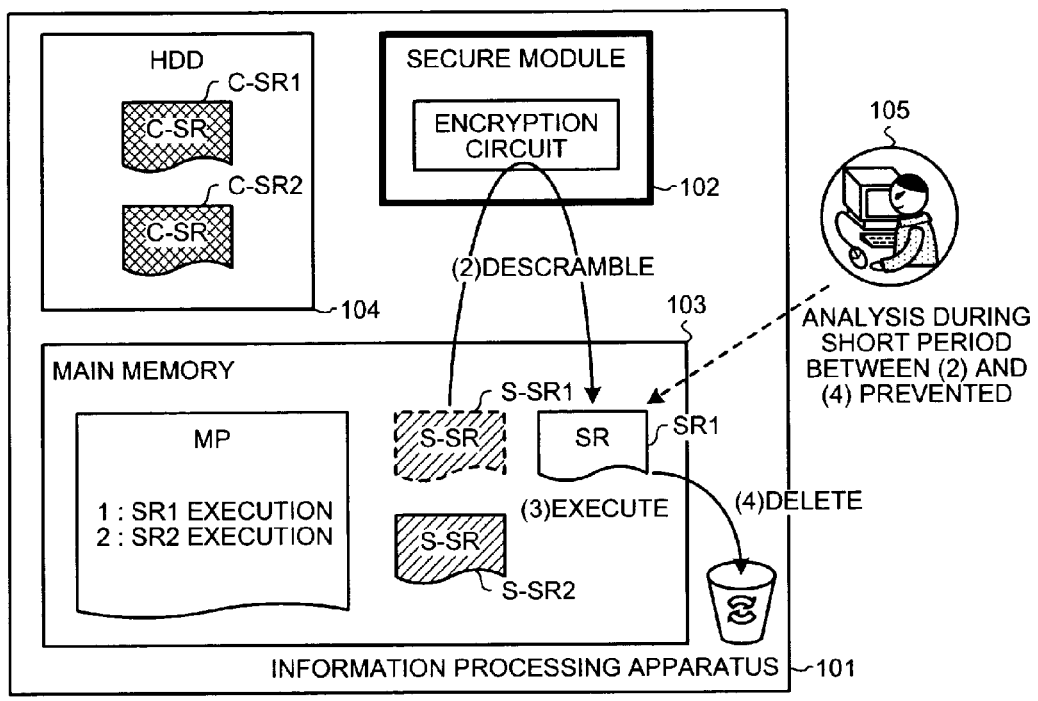

FIGS. 1A and 1B are diagrams depicting program tampering prevention by the information processing apparatus. As depicted in FIGS. 1A and 1B, an information processing apparatus 101 has a secure module 102, a main memory 103, and a hard disk drive (HDD) 104.

The HDD 104 is a storage device that stores programs executed by the information processing apparatus 101. In the example depicted in FIG. 1, the HDD 104 retains therein an encrypted subroutine C-SR obtained consequent to encrypting a subroutine (SR) (e.g., SR1 and SR2 in FIGS. 1A and 1B) by an encrypting method of a high cipher strength. An encrypting method of a high cipher strength is, for example, a standardized encrypting method compliant with encryption standards such as Advanced Encryption Standard (AES) and New European Schemes for Signature, Integrity, and Encryption (NESSIE).

The main memory 103 is a storage device that serves as a work area when the information processing apparatus 101 executes a program. In the example depicted in FIGS. 1A and 1B, a main program MP that calls and executes a subroutine SR is written to the main memory 103. Nonetheless, the main memory 103 is a storage device from which data can be read out (even by a cracker 105) and for which authenticity is not guaranteed.

The secure module 102 is a large-scale integration (LSI), such as a tamper resistance module (TRM), having a configuration such that information stored therein cannot be referred to by an external device. Consequently, the secure module 102 prevents third-parties from seeing and tampering with the internal data.

The secure module 102 has an encryption circuit. The encryption circuit can perform decryption by the encrypting method of a high cipher strength used to encrypt the encrypted subroutine C-SR in the HDD 104. Further, the encryption circuit can perform encryption and decryption by an encrypting method that performs high speed encryption and decryption. An encrypting method that performs high speed encryption and decryption is, for example, a method (hereinafter, "XOR encryption") of encrypting (scrambling) by the exclusive OR (XOR) of encrypted data and encryption-key data.

Here, an example will be described where when the main program MP is started, the information processing apparatus 101 prevents the analysis and the tampering of the subroutine SR by the cracker 105, and executes the subroutine SR called by the main program MP.

For example, as depicted by FIG. 1A, the information processing apparatus 101 writes the subroutine SR called by the main program MP, to the main memory 103, which is used as a work area. Here, since authenticity is not guaranteed for the main memory 103, if the subroutine SR is written thereto in a non-encrypted state, the subroutine SR is at risk of being analyzed by the cracker 105.

(1) Consequently, the information processing apparatus 101 writes the subroutine SR in an encrypted state to the main memory 103 and when the subroutine SR is executed, decrypts the subroutine SR. Since high-speed decryption of the subroutine SR is performed, the secure module 102 for which authenticity is guaranteed, decrypts the encrypted subroutine C-SR, scrambles the decrypted subroutine SR by XOR encryption, and writes the encrypted subroutine S-SR to the main memory 103.

As depicted in FIG. 1A, the subroutine SR written to the main memory 103 is in an encrypted state (the encrypted subroutine S-SR), thereby enabling analysis by the cracker 105 to be prevented. Further, since the encryption and decryption of the subroutine SR is performed at the secure module 102 for which authenticity is guaranteed, the cracker 105 cannot see the subroutine SR in the decrypted state. Similarly, the cracker 105 cannot see the encrypting method used on the subroutine SR nor the encryption key.

Here, a case is assumed where the main program MP has been started and a request for the execution of the subroutine SR1 has been issued by the main program MP.

As depicted in FIG. 1B, upon an execution request for the subroutine SR1, (2) the secure module 102 for which authenticity is guaranteed, decrypts (descrambles) the encrypted subroutine S-SR1 into the subroutine SR1.

(3) The information processing apparatus 101 executes the descrambled subroutine SR1. (4) Upon completing execution of the subroutine SR1, the information processing apparatus 101 deletes the subroutine SR1. Further, for execution requests for the subroutine SR2 as well, the information processing apparatus 101 similarly performs (2) to (4), executing and deleting the subroutine SR2.

As depicted in FIG. 1B, the time that the subroutine SR decrypted for execution resides in the main memory 103 is only the time from decryption when execution of the subroutine SR starts until deletion when the execution of the subroutine SR ends. Consequently, the time during which the cracker 105 can analyze the subroutine SR is only the short period from decryption to deletion of the subroutine SR and as a result the cracker 105 cannot analyze the subroutine SR.

In this manner, the information processing apparatus 101 prevents the tampering and analysis of the subroutine SR by the cracker 105, whereby the development of malicious software can be prevented. Further, the use of XOR encryption enables the information processing apparatus 101 to be configured such that even if the subroutine SR is in an encrypted state up until just prior to execution, the execution of the main program MP is not delayed by the decryption of the subroutine SR. Further, in the XOR encryption, since encryption and decryption are realized by the same process, when XOR encryption is adopted, the secure module 102 can be simplified and produced more affordably.

Further, with respect to information (encryption keys and user identification information), which is in the secure module 10 and must be kept confidential, the use of such information in malicious software as well as damage incurred by the user of the information processing apparatus 101 consequent to malicious software can be eliminated. For example, the development of malicious software can be prevented, such as in the case where software for online purchases is analyzed and tampered with to rewrite purchase order information input by the user. Further, damages incurred by the use of an encryption key or user identification information in the secure module 102 by malicious software to transmit false purchase order information can be eliminated.

Figure 2:
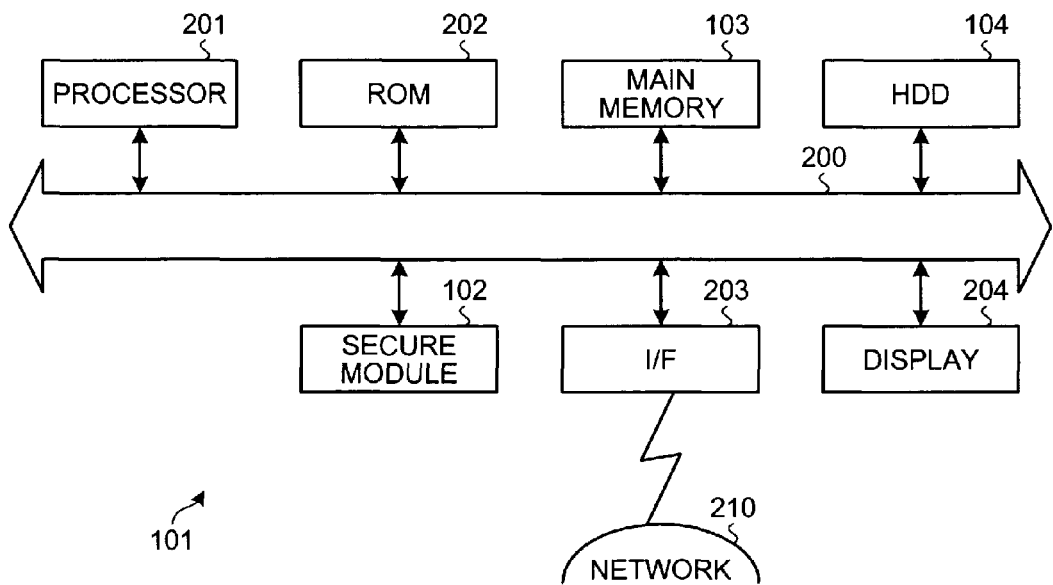
FIG. 2 is a block diagram of a first hardware configuration example of an information processing apparatus 101 according to the embodiment.
Figure 3:
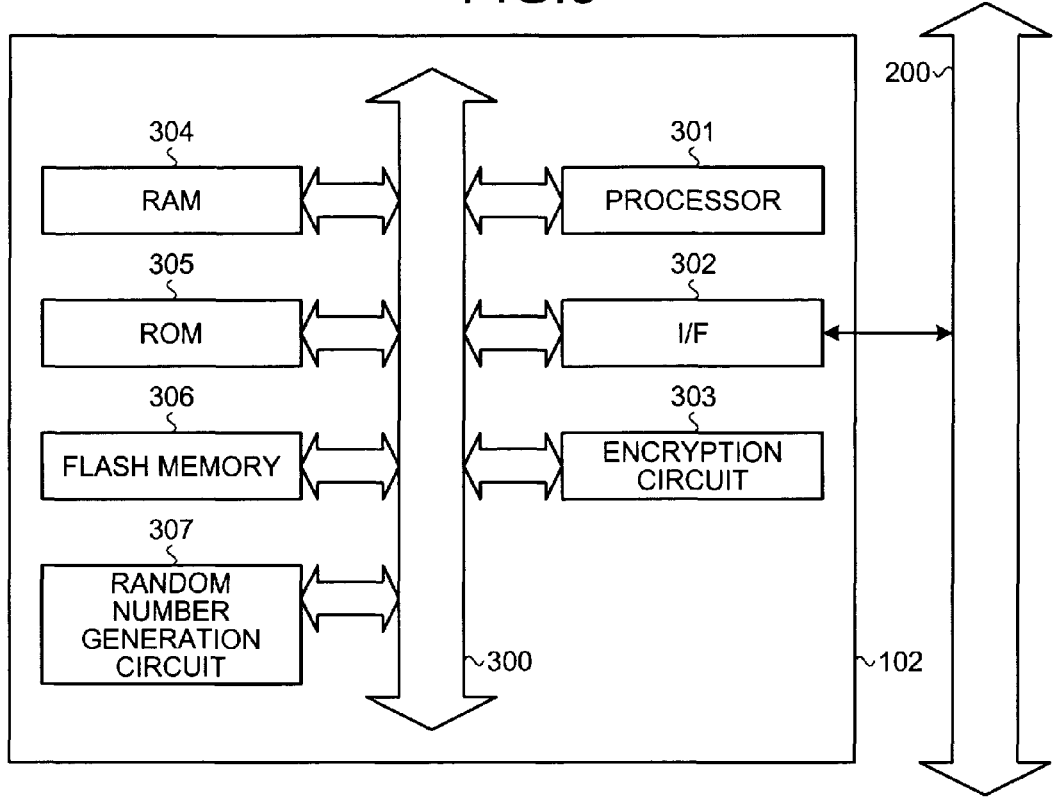
FIG. 3 is a block diagram of a hardware configuration example of a secure module 102 depicted in FIG. 2.

Hardware configuration of the information processing apparatus 101 will be described. As depicted in FIG. 1, although the information processing apparatus 101 has the secure module 102, the secure module 102 may be created by one chip or by multiple chips. With reference to FIGS. 2 and 3, a hardware configuration of the information processing apparatus 101 will be described in which the secure module 102 is configured by one chip.

FIG. 2 is a block diagram of a first hardware configuration example of the information processing apparatus 101 according to the embodiment. As depicted in FIG. 2, the information processing apparatus 101 includes a processor 201, a read-only memory (ROM) 202, the secure module 102, the main memory 103, and the HDD 104. Further, the information processing apparatus 101 includes an interface (I/F) 203 and a display 204. The components of the information processing apparatus 101 are respectively connected by a bus 200.

The processor 201 governs overall control of the information processing apparatus 101. The ROM 202 stores therein programs such as a boot program. The main memory 103 is used as a work area of the processor 201. The HDD 104 is a driving apparatus that under the control of the processor 201, controls the reading and writing of data with respect to an internal hard disk.

The I/F 203 is connected, via a communication line, to a network 210 such as a local area network (LAN), a wide area network (WAN) and the Internet, and is further connected to other apparatuses through the network 210. The I/F 203 administers an internal interface with the network 210 and controls the input and output of data from and to external apparatuses. A modem, LAN adapter and the like may be adopted as the I/F 203.

The display 204 displays, for example, data such as text, images, functional information, etc., in addition to a cursor, icons, and/or tool boxes. A cathode ray tube (CRT), a thin-film-transistor (TFT) liquid crystal display, a plasma display, etc., may be adopted as the display 204.

The secure module 102 has a function of reading out the encrypted subroutine C-SR from the HDD 104. Further, the secure module 102 has a function of writing the subroutine SR to the main memory 103, an encryption function, a decrypting function, a random number generation function, etc. The secure module 102 securely retains therein an encryption key that decrypts the encrypted subroutine C-SR and an encryption key for XOR encryption.

However, configuration may be such that the secure module 102 only retains encryption keys and the encryption function the random number generation function, the decrypting function, etc. are included in the information processing apparatus 101. In this case, the secure module 102 might generate encryptions keys using the random number generation function and outputs an encryption key according to a request from the information processing apparatus 101. The secure module 102 may be built into the information processing apparatus 101 or provided independently.

FIG. 3 is a block diagram of a hardware configuration example of the secure module 102 depicted in FIG. 2. The secure module 102 includes a processor 301, an I/F 302, an encryption circuit 303, a RAM 304, a ROM 305, a flash memory 306, and a random number generation circuit 307, respectively connected by a bus 300.

The processor 301 performs internal control of the secure module 102 and computation processes. The I/F 302 is connected to the internal components of the information processing apparatus 101 via the bus 200 and performs communication. The encryption circuit 303 encrypts data and programs, and decrypts encrypted data and programs. If encryption and decryption are executed by software, a program corresponding to the function of the encryption circuit 303 is stored to the ROM 305, eliminating the need for the encryption circuit 303.

The RAM 304 is a main memory used as a work area of the processor 301. The ROM 305 is nonvolatile memory storing therein programs and data. The ROM 305 stores therein an encryption key that decrypts the encrypted subroutine C-SR and an encryption key for XOR encryption. The flash memory 306 is nonvolatile memory to which stored data and programs can be rewritten. The random number generation circuit 307 might generate random numbers such as encryption key for XOR encryption.

Since third-party sniffing and tampering is presumed, as far as possible, the secure module 102 is to be mounted as a single-chip LSI of a configuration as depicted in FIG. 3. For example, the secure module 102 is of a TRM configuration. A TRM configuration is a configuration that physically and logically protects against internal analysis and tampering of a semiconductor chip (in this case, the secure module 102). For instance, a strong and highly adhesive coating is applied to the secure module 102 and if this surface is peeled away, the circuit inside is completely destroyed, or dummy wiring may be disposed in the secure module 102, etc.

Figure 4:
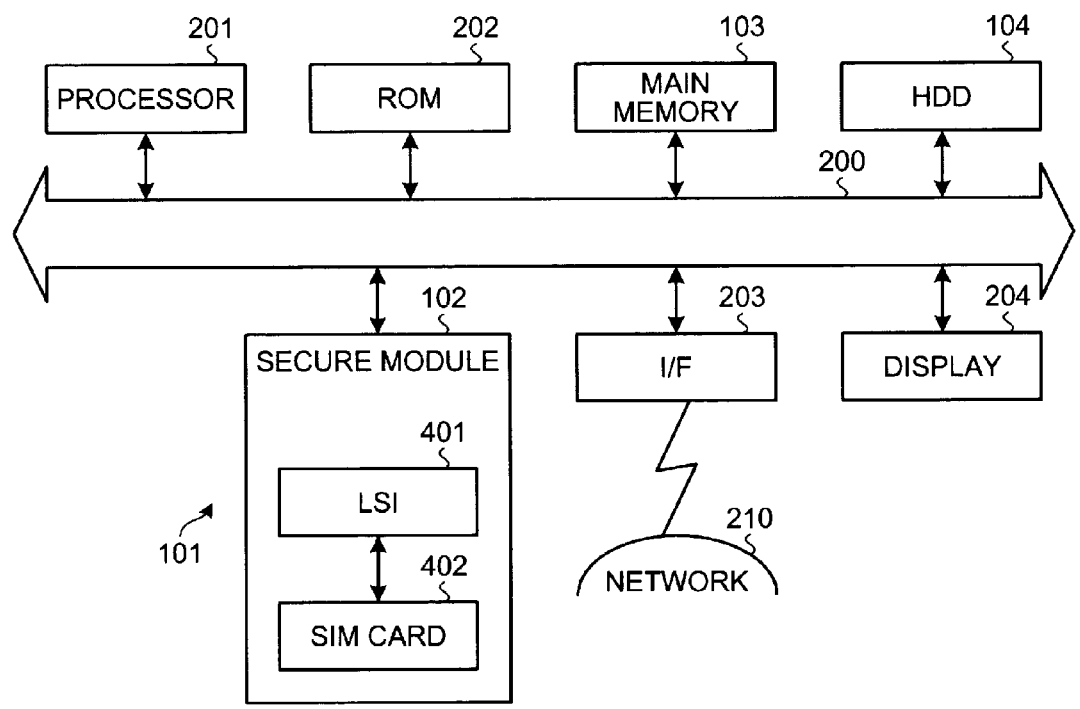
FIG. 4 is a block diagram of a second hardware configuration example of the information processing apparatus 101 according to the embodiment.
Figure 5:
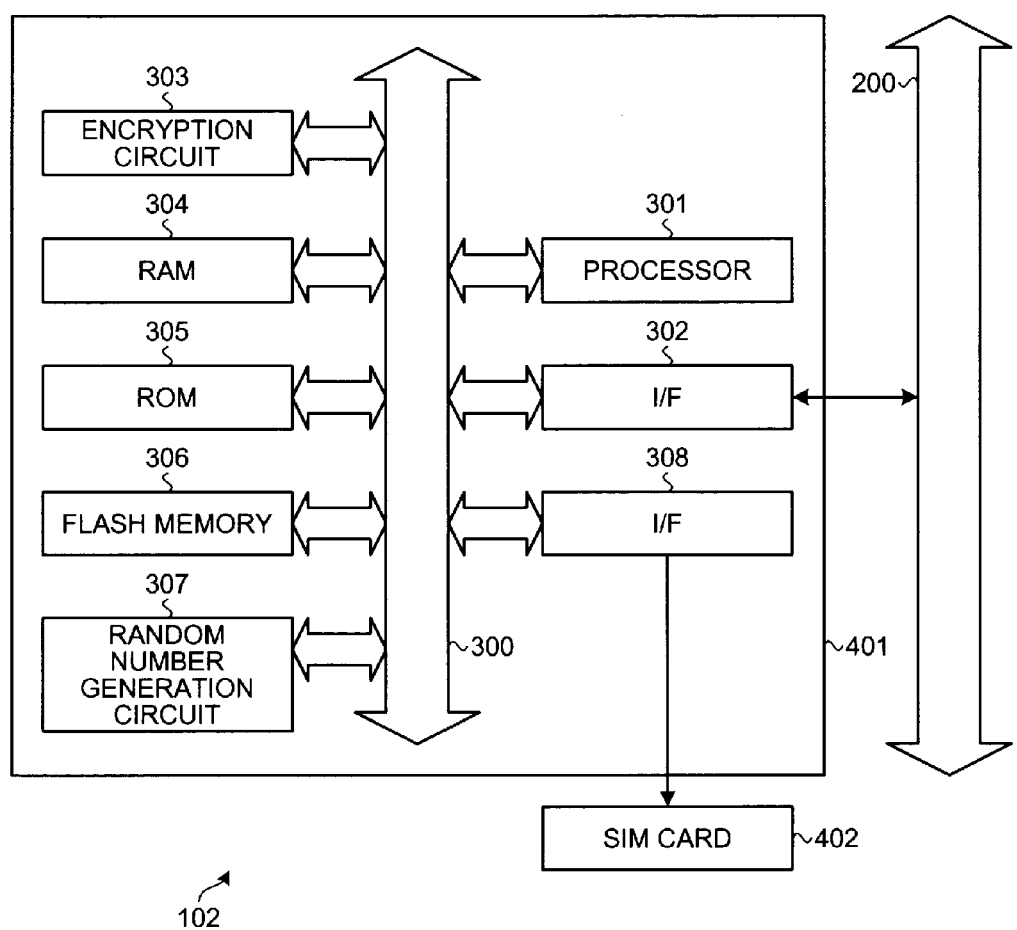
FIG. 5 is a block diagram of a hardware configuration example of the secure module 102 depicted in FIG. 4.

With reference to FIGS. 4 and 5, a hardware configuration of the information processing apparatus 101 will be described in which the secure module 102 is configured by multiple chips.

FIG. 4 is a block diagram of a second hardware configuration example of the information processing apparatus 101 according to the embodiment. As depicted in FIG. 4, the information processing apparatus 101 includes the processor 201, the ROM 202, the main memory 103, the HDD 104, the I/F 203, the display 204, and the secure module 102. In FIG. 4, components identical to those depicted in FIG. 2 are given the same reference numerals used in FIG. 2 and description thereof is omitted.

As depicted in FIG. 4, the secure module 102 is formed to be adjoined to an LSI 401 that has an encryption function, a decrypting function, a random number generation function, etc. and to be adjoined to an existing SIM card 402 securely retaining therein an encryption key that decrypts the encrypted subroutine C-SR. As necessary, the LSI 401 reads out the encryption key from the SIM card 402 and uses the encryption function and the decrypting function.

FIG. 5 is a block diagram of a hardware configuration example of the secure module 102 depicted in FIG. 4. As depicted in FIG. 5, the secure module 102 includes the LSI 401 and the SIM card 402. The LSI 401 includes the processor 301, the I/F 302, the encryption circuit 303, the RAM 304, the ROM 305, the flash memory 306, and the random number generation circuit 307. The SIM card 402 securely retains therein an encryption key. Inside the secure module 102, the LSI 401 and the SIM card 402 are connected by the I/F 308 and perform communication. In FIG. 5, components identical to those depicted in FIG. 3 are given the same reference numerals used in FIG. 3 and description thereof is omitted.

Since third-party sniffing and tampering is presumed, when the secure module 102 is implemented by multiple chips as depicted in FIG. 5, the entirety of the chips are regarded as a single module and have to be fixed by resin and mounted such that third-party sniffing and tampering is difficult.

Figure 6:
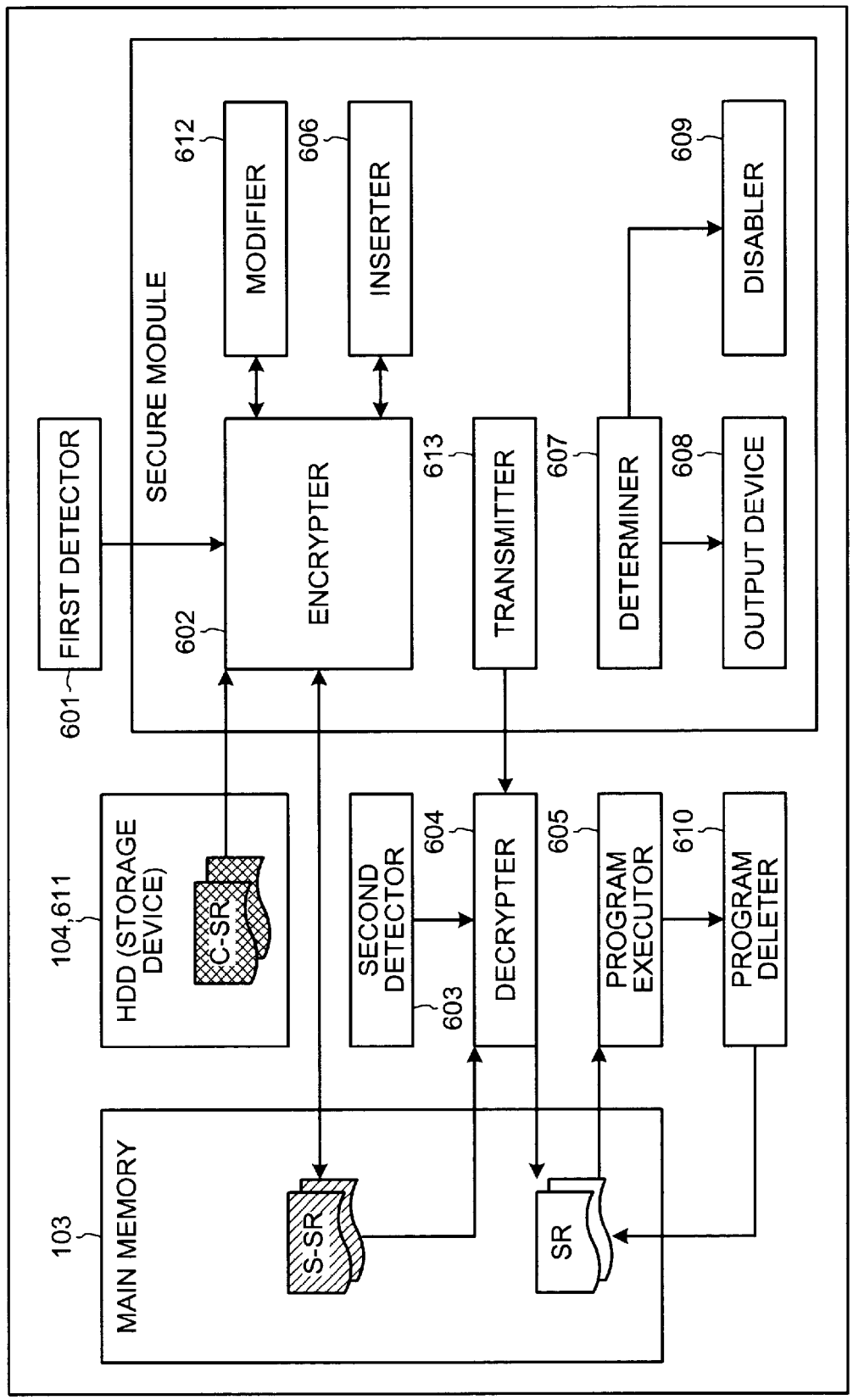
FIG. 6 is a block diagram of a first example of a functional configuration of the information processing apparatus 101.

A first example of a functional configuration of the information processing apparatus 101 will be described. FIG. 6 is a block diagram of a first example of a functional configuration of the information processing apparatus 101. The information processing apparatus 101 includes a first detector 601, an encrypter 602, a second detector 603, a decrypter 604, a program executor 605, an inserter 606, a determiner 607, an output device 608, a disabler 609, a program deleter 610, a storage device 611, a modifier 612, and a transmitter 613.

These functions (the first detector 601 to the program deleter 610) forming a controller are implemented by, for example, executing on the processor 201, a program stored in a storage device such as the ROM 202, the main memory 103, and the HDD 104 depicted in FIG. 2, or via the I/F 203. Alternatively, the functions (the first detector 601 to the program deleter 610) forming the controller are implemented by, for example, executing on the processor 301, a program stored in a storage device such as the ROM 305, the RAM 304, and the flash memory 30 depicted in FIG. 3, or via the I/F 302.

The first detector 601 has a function of detecting an execution waiting state of a program among a group of programs. Here, this program is a program called by another program, e.g., a main program MP called by an operating system (OS), or the subroutine SR called by the main program MP. The execution waiting state is a state of waiting to be called by a given program, when the given program is started.

For example, the first detector 601 detects that the subroutine SR has entered a state of waiting to be called by the main program MP, which has been started. Thus, a trigger can be detected, e.g., a trigger to write to the main memory 103 (a work area), a program that is called by another program.

The encrypter 602 is included in the secure module 102 and has a function of encrypting the program and writing the program to a storage area different from that of the group of programs, when an execution waiting state is detected by the first detector 601. Here, a storage area different from that of the group of programs is a program work area, such as the main memory 103.

For example, the encrypter 602 encrypts the subroutine SR and writes the encrypted subroutine SR to the main memory 103. Consequently, security is guaranteed by encrypting the program written to the main memory 103, even though the main memory 103 can be referred to by anyone and the security thereof is not guaranteed. Further, since the encryption is performed at the secure module 102 for which authenticity is guaranteed, the encrypting method used for the encryption and the program prior to encryption remain confidential and the security of the program can be guaranteed.

For example, the encrypter 602 uses a different encrypting method each time encryption is performed. A different encrypting method is, for example, the use of different data for the encryption key each time encryption is performed. Here, different data is, for example, a random number sequence generated by the random number generation circuit 307. However, in this case, in performing encryption, a table correlating the program subject to encryption and the encryption key is stored; and when decryption is performed, the table is referred to and the encryption key to be used in the decryption is identified. As a result, each time encryption is performed, the encryption key changes, making analysis of the program by a cracker difficult.

For example, the encrypter 602 uses an encrypting method that encrypts by the exclusive OR of the encryption-key data and the program to be encrypted. In other words, encryption is performed by the XOR encryption described above. The XOR encryption is encryption for which the amount of processing for and the time consumed for encryption and decryption is low; therefore, when the encrypted program is executed, the time consumed for decrypting the encrypted program can be reduced. Further, in the XOR encryption, since encryption and decryption are realized by the same process, when XOR encryption is adopted, the secure module 102 can be simplified and produced more affordably.

The encrypter 602 has a function of decrypting an encrypted program group (C-SR), when a program that calls the program group is started. Further, the encrypter 602 has a function of encrypting the decrypted program group by a second encrypting method that is different from a first encrypting method used to encrypt the program group (C-SR) and writing the resulting encrypted program group (S-SR) to a storage area.

Here, the program that calls the program group is, for example, the main program MP. The encrypted program group is, for example, the encrypted subroutine C-SR retained in the HDD 104. The first encrypting method is an encrypting method having a high cipher strength. The second encrypting method is an XOR encrypting method that has a high cipher strength and for example, uses an encryption key having a long data length.

For example, the encrypter 602 first encrypts the encrypted subroutine C-SR retained in the HDD 104 by XOR encryption of a high cipher strength and then writes the encrypted subroutine S-SR to the main memory 103. Consequently, even if the program written to the main memory 103 is not executed for a long period, the security of the program can be guaranteed. "Not being executed for a long period" means, for example, a state that continues where although the main program MP has been started, an execution instruction has not been input from the user of the information processing apparatus 101.

The second detector 603 has a function of detecting an execution request for a program among the program group. For example, the second detector 603 detects that execution of the subroutine SR has been requested by the main program MP. Consequently, the second detector 603 can detect a trigger for decryption of the encrypted subroutine S-SR.

The decrypter 604 has function of decrypting any one of the programs encrypted by the secure module 102 and writing the decrypted program to a storage area, when an execution request for the program is detected by the second detector 603.

For example, the decrypter 604 is independent of the secure module 102 and uses an encryption key that is provided by the secure module 102 and used by the secure module 102 in the encryption of the program, to decrypt the program. The encryption key provided by the secure module 102 is transmitted by a transmitter 613 described hereinafter.

For example, the decrypter 604 uses the encryption key for XOR encryption provided by the secure module 102 and decrypts the encrypted subroutine S-SR. Thus, the decrypter 604 is able to put the subroutine SR in an executable state and write the subroutine SR to the main memory 103.

Further, since the secure module 102 maintains the confidentiality of the encryption key until decryption, analysis of the program by the cracker 105 can be prevented. In addition, if the secure module 102 uses a different encryption key for each encryption, the same key is not used for a subsequent encryption. As a result, even if an encryption key becomes known to the cracker 105 by provision to the information processing apparatus 101, the cracker 105 cannot use the current encryption key for the next or any subsequent decryption of the encrypted subroutine S-SR, enabling security to be guaranteed.

Although the decrypter 604 may be integrated into the secure module, by being independent of the secure module 102, functions of the secure module 102 can be reduced, enabling the secure module 102 to be produced more affordably.

The program executor 605 has a function of executing a program that has been decrypted by the decrypter 604. For example, the program executor 605 executes the subroutine SR, thereby enabling processes of the main program MP to be performed normally.

The inserter 606 is provided in the secure module 102 and has a function of inserting into a program prior to encryption, a computing program that performs a given computation and writes the computation result to a given area of the storage area. Here, the computing program is a program that performs a given computation and stores the computation result to a given area in the main memory 103 and an authentication subprogram described hereinafter. For example, the inserter 606 executes a modifying program described hereinafter and inserts the authentication subprogram into the subroutine SR.

The determiner 607 is provided in the secure module 102 and has a function of acquiring according to the program executed by the program executor 605, the computation result written by the computing program. The determiner 607 has a function of determining that the program has been tampered with if the acquired computation result and a computation result obtained by performing a given computation at the secure module 102 do not coincide.

For example, the determiner 607 acquires the computation result written to the main memory 103 by the authentication subprogram, which is executed consequent to the execution of the subroutine SR. Next, at the secure module 102, a computation identical to that of the authentication subprogram is performed to compute an authentic computation result and if the computation result written by the authentication subprogram is not the authentic computation result, the program is determined to have been tampered with.

The computation performed by the inserted authentication subprogram is a different computation each time, making the development of a malicious program into which a legitimate authentication subprogram has been inserted by the cracker 105 difficult.

The output device 608 is provided in the secure module 102 and has a function of outputting the determination result when the tampering of a program has been determined by the determiner 607. For example, when tampering has been determined, the output device 608 outputs to the display 204, notification to the user of the information processing apparatus 101 that a malicious program may be executed, thereby preventing damage consequent to a malicious program.

The disabler 609 has a function of setting the decrypter 604 to a disabled state when tampering has been determined by the determiner 607. For example, the disabler 609 disables the decrypter 604, the encrypter 602, or all functions when tampering has been determined by the determiner 607. As a result, the disabler 609 can cause the secure module 102 to not respond to a decryption request from a program for which tampering has been detected. Alternatively, the disabler 609 can disable the continuation of a malicious program.

The program deleter 610 has a function of deleting from a storage area, a program for which execution by the program executor 605 has been completed. For example, the program deleter 610 deletes the subroutine SR written to the main memory 103. As a result, the period of time that a program in a nonencrypted state resides in the main memory 103 for which security is not guaranteed, is reduced, thereby enabling program analysis and tampering by the cracker 105 to be prevented.

The storage device 611 has a function of retaining the encrypted program group. For example, the storage device 611 is the HDD 104 and retains the encrypted subroutine C-SR. Thus, programs are securely retained.

The modifier 612 has a function of modifying a program such that the description content differs, but the function is the same program code. For example, the modifier 612 modifies the subroutine SR by "obfuscation", "encryption", and "shuffling" described hereinafter, thereby making the decoding of the subroutine SR difficult and enabling analysis and tampering of the subroutine SR by the cracker 105 to be prevented.

The transmitter 613 has a function of transmitting to the information processing apparatus, a key that decrypts an encrypted program when an execution request for the program has been detected. For example, the transmitter 613 transmits to the information processing apparatus 101, an encryption key for XOR encryption and retained in the RAM 304.

Further, when the secure module 102 uses a different encryption key for each encryption, the transmitter 613 refers to a table correlating and storing the encryption keys and the encrypted subroutines S-SR and identifies the encryption key that corresponds to the encrypted subroutine S-SR for which execution is requested. The transmitter 613 transmits the identified encryption key to the information processing apparatus 101.

Thus, the information processing apparatus 101 can obtain the encryption key to be used when the encrypted subroutine S-SR is to be decrypted by the decrypter 604.

Figure 7:
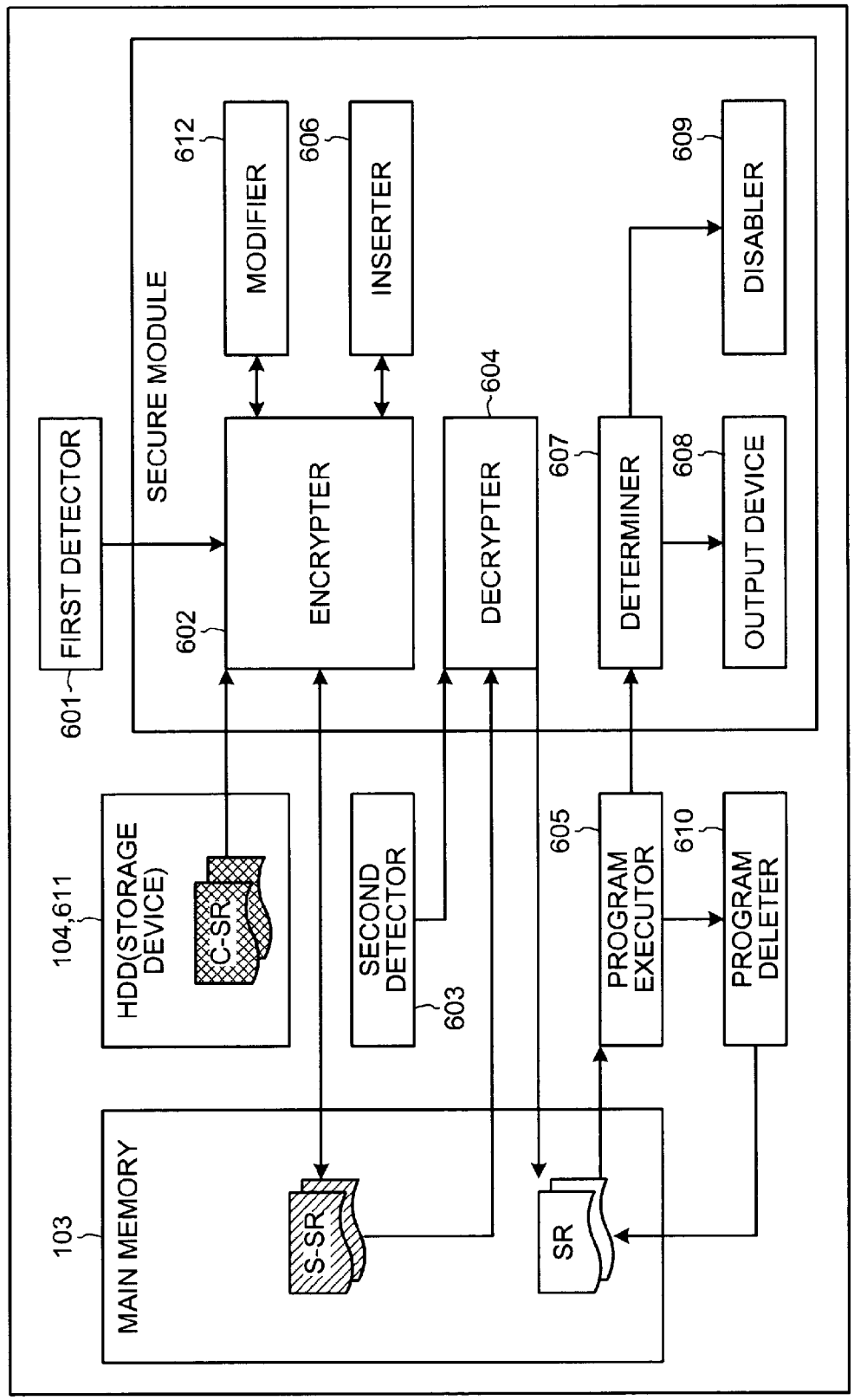
FIG. 7 is a block diagram of a second example of the functional configuration of the information processing apparatus 101.

Further, as depicted in FIG. 7, the decrypter 604 may be provided in the secure module 102. FIG. 7 is a block diagram of a second example of the functional configuration of the information processing apparatus 101.

For example, the decrypter 604 is provided in the secure module 102, decrypts the encrypted subroutine S-SR, and writes the decrypted subroutine SR to the main memory 103. Thus, the decrypter 604 is able to put the subroutine SR in an executable state and write the subroutine SR to the main memory 103. Further, since the secure module 102 (for which authenticity is guaranteed) includes the decrypter 604, the encrypting method and encryption key can be kept confidential, facilitating the prevention of program analysis by the cracker 105.

Figure 8:
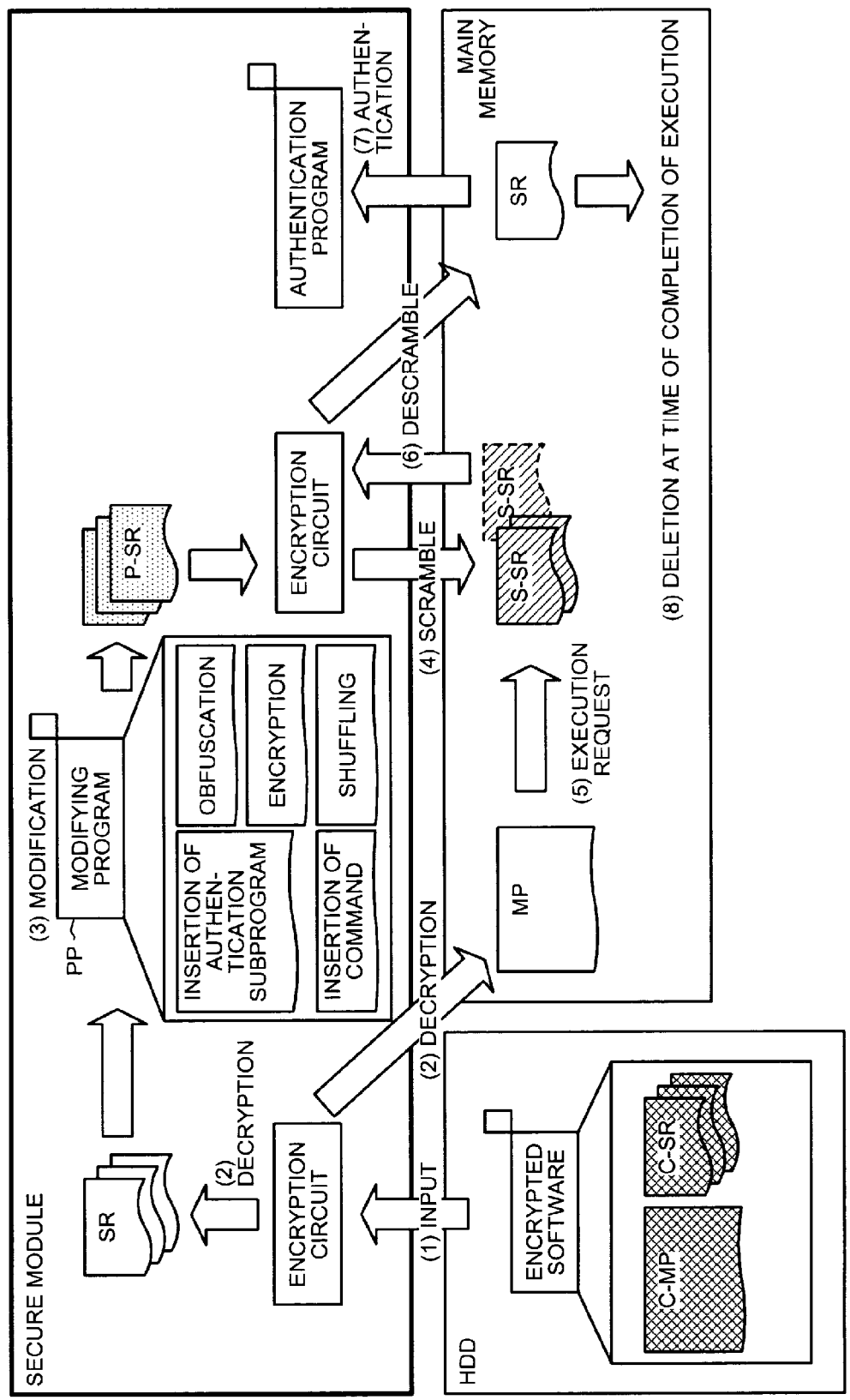
FIG. 8 is a diagram of an example of operations of the information processing apparatus 101.

With reference to FIG. 8, an example of operations of the information processing apparatus 101 will be described.

FIG. 8 is a diagram of an example of operations of the information processing apparatus 101. (1) The information processing apparatus 101 inputs to the secure module 102, encrypted software on the HDD 104 in order to execute the encrypted software, which includes an encrypted main program C-MP and the encrypted subroutine C-SR group.

(2) The secure module 102 decrypts the encrypted main program C-MP included in the input encrypted software and writes the decrypted main program MP to the main memory 103. The secure module 102 further decrypts the encrypted subroutine C-SR group included in the input encrypted software.

(3) The secure module 102 uses a modifying program PP to modify each of the subroutines SR in the decrypted subroutine SR group. "Insertion of an authentication subprogram, command, etc.", "the obfuscation, encryption, or shuffling of the subroutine SR", etc. may be given as examples of the contents of the modifying program PP. Thus, the secure module 102 modifies each of the subroutines SR in the subroutine SR group such that analysis and tampering by the cracker 105 become difficult.

(4) The secure module 102 scrambles by XOR encryption, the modified subroutines P-SR included in the modified subroutine P-SR group and generates the encrypted subroutine S-SR group. Next, the secure module 102 writes the generated encrypted subroutine S-SR group to the main memory 103.

(5) Here, the information processing apparatus 101 executes the main program MP. The executed main program MP issues an execution request for any one of the subroutines SR among the subroutine SR group.

(6) Upon detecting the issuance of an execution request for the subroutine SR and based on the detected execution request, the information processing apparatus 101 descrambles the encrypted subroutine S-SR, thereby obtaining the subroutine SR for which execution is requested.

Descrambling can be implemented by, for example, inserting into the subroutine SR at (3), "a command to output to the secure module 102, a request for descrambling of the subroutine SR" as a command to not subject the subroutine SR to the encryption at (4). The encrypted subroutine S-SR is removed from the main memory 103 by decryption.

For example, the information processing apparatus 101 requests the secure module 102 to descramble the encrypted subroutine S-SR. Alternatively, the information processing apparatus 101 requests the secure module 102 to provide an encryption key used to descramble the encrypted subroutine S-SR and uses the encryption key provided by the secure module 102 to descramble the encrypted subroutine S-SR.

(7) The information processing apparatus 101 executes the descrambled subroutine SR. Here, upon execution of the subroutine SR, the authentication subprogram inserted into the subroutine SR is also executed. The executed authentication subprogram performs a given computation and stores the computation result to a given area in the main memory 103.

Meanwhile, the secure module 102 executes an authentication program. The executed authentication program performs a given computation that is identical to that of the authentication subprogram and thereby obtains an authentic computation result. The executed authentication program acquires the computation result stored by authentication subprogram and determines whether the acquired computation result coincides with the authentic computation result, thereby determining whether the subroutine SR has been tampered with.

Thus, when the authentication subprogram in the subroutine SR has been tampered with by the cracker 105, a determination that the computation results do not coincide results, enabling determination that the secure module 102 has been tampered with.

In the case of tampering, such indication is output to the user of the information processing apparatus 101, the subroutine SR under execution is terminated, the decrypting function of the secure module 102 is disabled, etc., whereby damage consequent to tampering by the cracker 105 can be prevented.

(8) The information processing apparatus 101, upon completion of the execution of the subroutine SR, deletes the subroutine SR. For example, the deletion of the subroutine SR can be implemented by an insertion of a "command to delete the subroutine SR" into the subroutine SR at (3).

Thus, the period of time that the subroutine SR in a non-encrypted state resides in the main memory 103 is from (6) to (8) above, enabling the time for the cracker 105 to analyze and tamper with the subroutine SR to be eliminated. Consequently, the development of malicious software by the cracker 105 can be prevented.

Further, when the deleted subroutine SR is a subroutine SR that is executed multiple times by the main program MP, the information processing apparatus 101 copes by newly generating and writing to the main memory 103, the encrypted subroutine S-SR. Consequently, the second or any subsequent time that the subroutine SR is called by the main program MP, a state in which the called subroutine SR has already been deleted and does not reside in the main memory 103 can be prevented.

With reference to FIGS. 9 to 24, each of the operations of the information processing apparatus 101 depicted in FIG. 8 will be described in detail. First, with reference to FIGS. 9 to 16C, modification of the subroutine SR depicted at (3) in FIG. 8 will be described.

For simplicity, in FIGS. 9 to 13, the subroutine SR in the main memory 103 and the HDD 104 is depicted in a nonencrypted state. However, in actuality, in the main memory 103 and the HDD 104, the subroutine SR is in an encrypted state.

Figure 9:
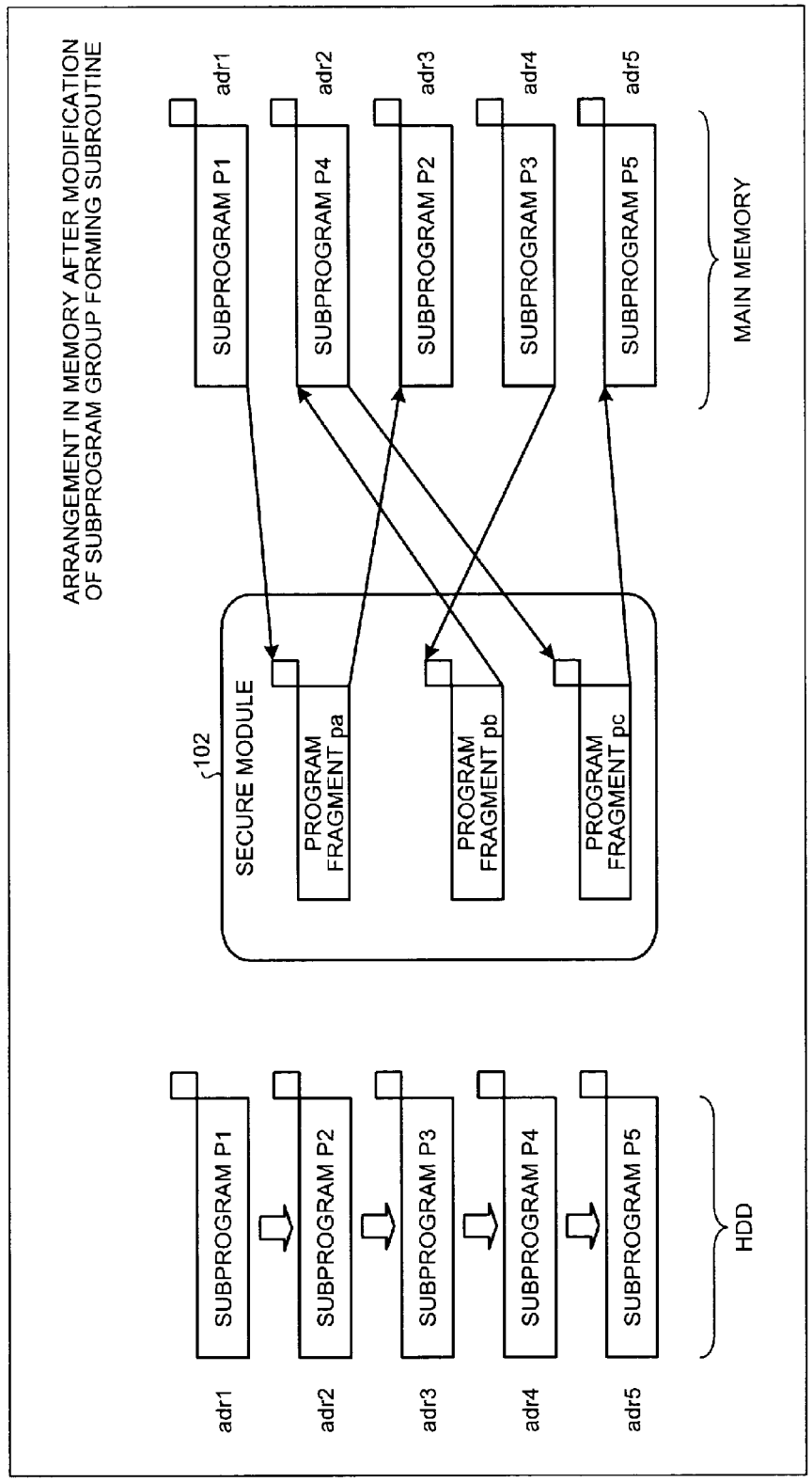
FIG. 9 is a diagram of an overview of modification of a subroutine SR.

FIG. 9 is a diagram of an overview of modification of the subroutine SR. The subroutine SR is modified by the modifying program PP, which is executed by the processor 301 of the secure module 102.

The subroutine SR (program) is a collection of commands according to address. Here, for easy understanding, the subroutine SR is assumed to be made up of commands of 5 addresses. For example, the subroutine SR is assumed to be formed of subprograms P1 to P5, which are executed sequentially according to address, from address adr1 to adr5. Therefore, the subprograms P1 to P5 are stored in the HDD 104 in the order of address, as logical addresses, from address adr 1 to adr5, which is the execution order.

The sequential arrangement of the subroutine SR (subprograms P1 to P5), i.e., the addresses, are rearranged by the modifying program PP. In FIG. 9, the subroutine SR is modified such that address adr1 is for the subprogram P1, address adr2 is for the subprogram P4, address adr3 is for the subprogram P2, address adr4 is for the subprogram P3, and address adr5 is for the subprogram P5.

In this case, a READ command for the secure module 102 is added after the subprograms P1, P4, and P3, respectively. The secure module 102 retains program fragments that indicate the correspondence relations after the addresses have been changed. For example, here, program fragment pa is assumed to be a GOTO statement that is referred to after the execution of the subprogram P1 and indicates a jump to address adr3.

Program fragment pb is assumed to be a GOTO statement that is referred to after the execution of the subprogram P3 and indicates a jump to address adr2. Further, program fragment pc is assumed to be a GOTO statement that is referred to after the execution of the subprogram P4 and indicates a jump to address adr5. The program fragments pa to pc are generated at modification.

Figure 10:
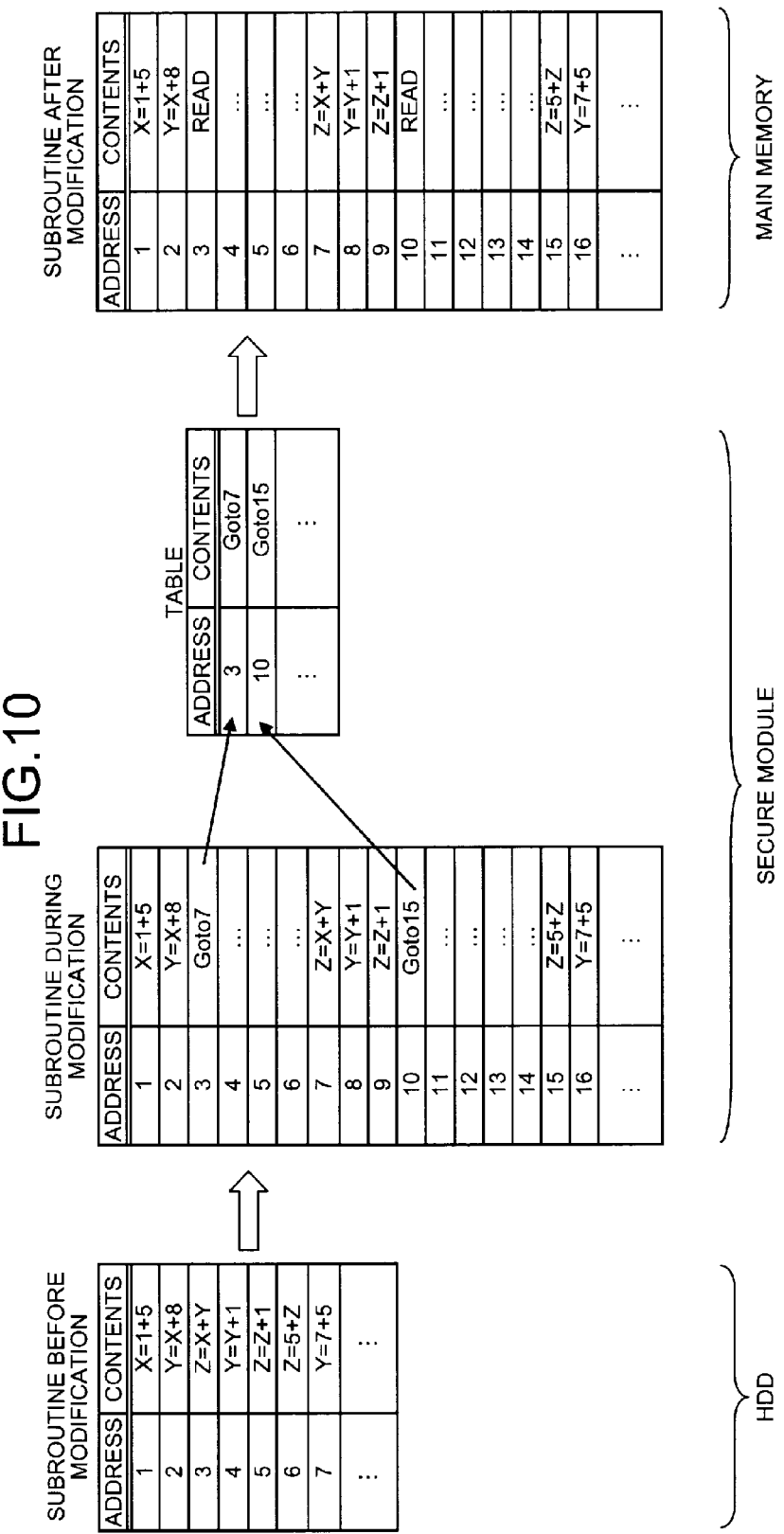
FIGS. 10, 11, 12, and 13 are diagrams depicting examples of modification of the subroutine SR by a modifying program PP.

FIGS. 10 to 13 are diagrams depicting examples of modification of the subroutine SR by the modifying program PP. In FIG. 10, the command groups at addresses 3 to 5 of the subroutine SR in the HDD 104 are moved to addresses 7 to 9.

Further, the command groups at addresses 6, 7 of the subroutine SR are moved to addresses 15, 16. The command groups at addresses 1, 2 remain as is.

Prior to modification, after command "Y=X+8" at address 2, command "Z=X+Y" at address 3 is executed. Since the command "Z=X+Y" at address 3 has been moved to address 7, the contents at address 3 are rewritten to a program fragment (jump command) "Goto7". The secure module 102 retains the combination of address 3 and the program fragment "Goto7" in a table.

Similarly, prior to modification, after the command "Z=Z+1" at address 5, the command "Z=5+Z" at address 6 is executed. Since the command "Z=Z+1" at address 5 has been moved to address 9 and the command at address 6 has been moved to address 15, the contents at address 10, which is subsequent to address 9 are rewritten to a program fragment (jump command) "Goto15". The secure module 102 retains the combination of address 10 and the program fragment "Goto15" in the table.

The secure module 102, prior to writing the subroutine SR to the main memory 103, rewrites the program fragments to READ commands for the secure module 102, whereby when the modified subroutine SR implemented on the main memory 103 is executed, the table in the secure module 102 is referred to according to the READ command at address 3 and the program fragment "Goto7" corresponding to address 3 is identified. The secure module 102 notifies the processor 201 of "Goto7", whereby the processor 201 executes the command at address 7 of the modified subroutine SR.

In this manner, the command groups forming the subroutine SR are shuffled while retaining correspondence relations. Consequently, by putting the subroutine SR in a state that is difficult to decipher, security can be improved.

Figure 11:
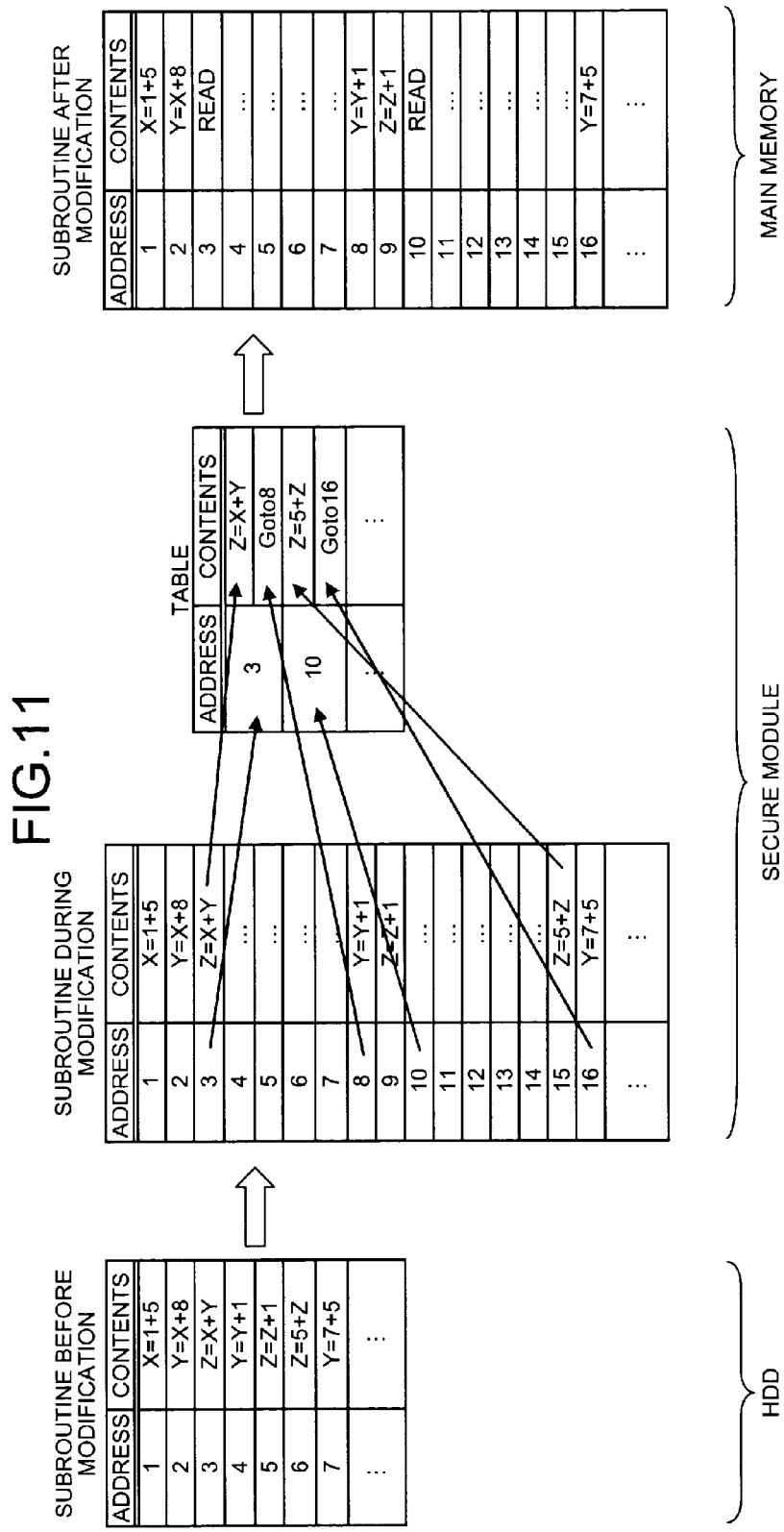

FIG. 11 is an example of modification that is more complicated than that depicted in FIG. 10. For example, in FIG. 10, the program fragment is simply a jump command, whereas in FIG. 11, the program fragment is not simply a jump command, but rather is a program fragment to which a command in the subroutine SR is further inserted.

In FIG. 11, the command groups at addresses 4, 5 of the subroutine SR in the HDD 104 are moved to addresses 8, 9. Further, the command groups at addresses 6, 7 of the subroutine SR are moved to addresses 15, 16. The command groups at addresses 1 to 3 remain as is.

Prior to modification, after the command "Y=X+8" at address 2, the command "Z=X+Y" at address 3 is executed. Since the command at address 4, which is subsequent to address 3, has been moved to address 8, a GOTO statement "Goto8" is generated. The secure module 102 stores the combination of address 3 and the corresponding contents (the command "Z=X+Y" and the generated GOTO statement "Goto8" at address 3). In this manner, the program fragment becomes complicated, not simply a jump command, enabling security to be improved.

Figure 12:
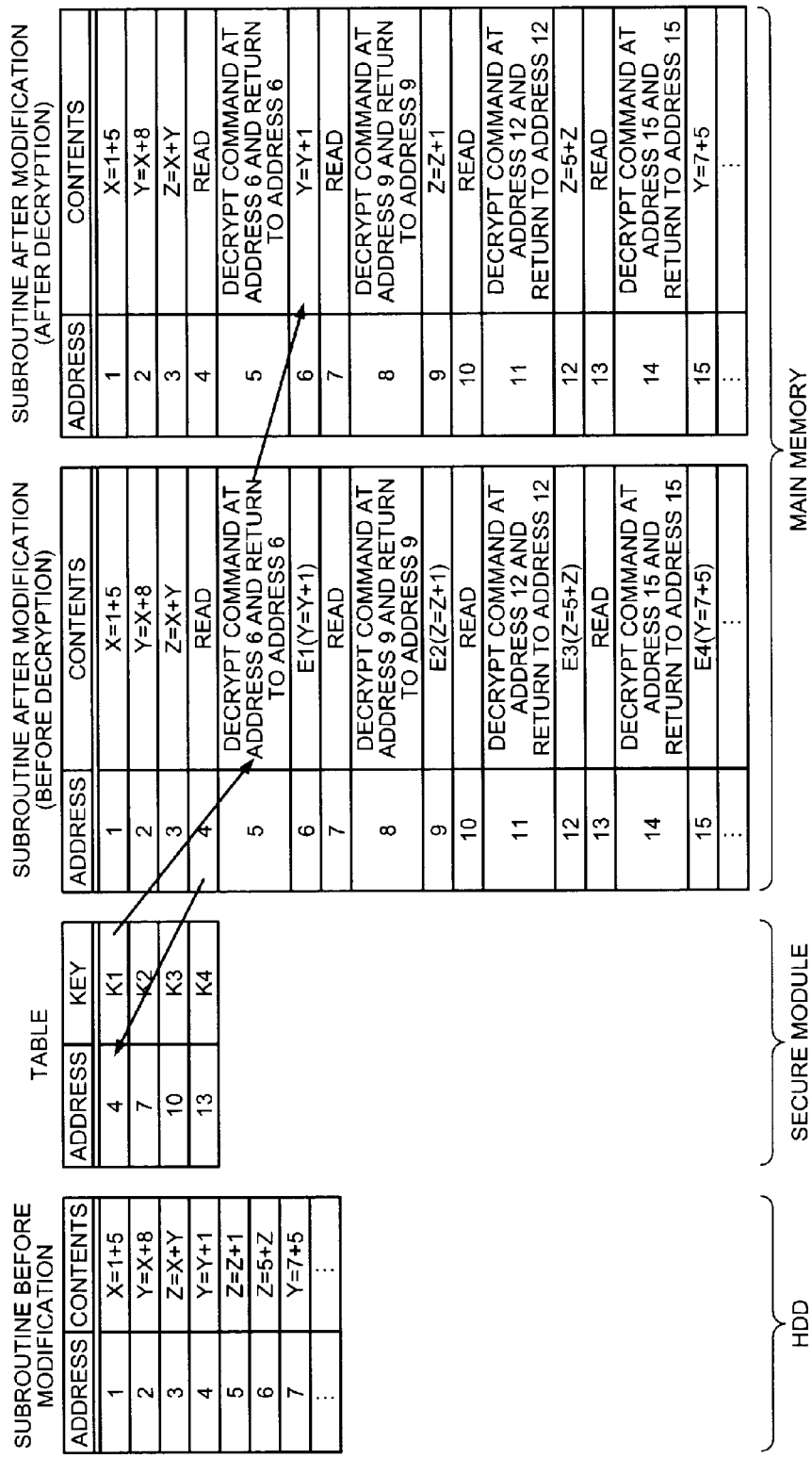

FIG. 12 is an example of encryption of a command group forming the subroutine SR. In FIG. 12, the secure module 102 encrypts the command groups at addresses 4 to 7 of the subroutine SR (before modification), using encryption keys K1 to K4. Next, a READ command and a DECRYPTION command for the secure module 102 are inserted before the encrypted command, whereby the addresses are shifted downward by the number of inserted commands.

For example, the command "Y=Y+1" at address 4 is encrypted by encryption key K1 and written to address 6. At address 4, which has become empty, a READ command for the secure module 102 is inserted and a DECRYPTION command is inserted at address 5.

The secure module 102 retains in a table, the combination of the key that encrypted the command and the address of the READ command inserted for the encrypted command in the subroutine SR (after modification). For example, secure module 102 retains in a table, the encryption key K1 that encrypted the command E1(Y=Y+1) written to address 6 and address 4 of the READ command inserted consequent to the generation of the encrypted command E1(Y=Y+1).

The secure module 102 retains the table in the RAM 304 or the flash memory 306, and writes the modified subroutine SR to the main memory 103. When the subroutine SR (after modification) is executed, the encryption key is read out according to the inserted READ command and the encrypted command is decrypted according to the subsequent DECRYPTION command, thereby enabling the decrypted command to be executed. For example, consequent to the READ command at address 4, the secure module 102 refers to the table and provides the encryption key K1 to the processor 201.

According to the DECRYPTION command at address 5, the processor 201 uses the encryption key K1 to decrypt the encrypted command E1(Y=Y+1), and writes the command "Y=Y+1" to address 6. At address 6, the command "Y=Y+1" is executed. In this manner, even if a portion of the subroutine SR is encrypted, a decryption key is acquired from the secure module 102, whereby the continuation of processing is enabled.

Figure 13:
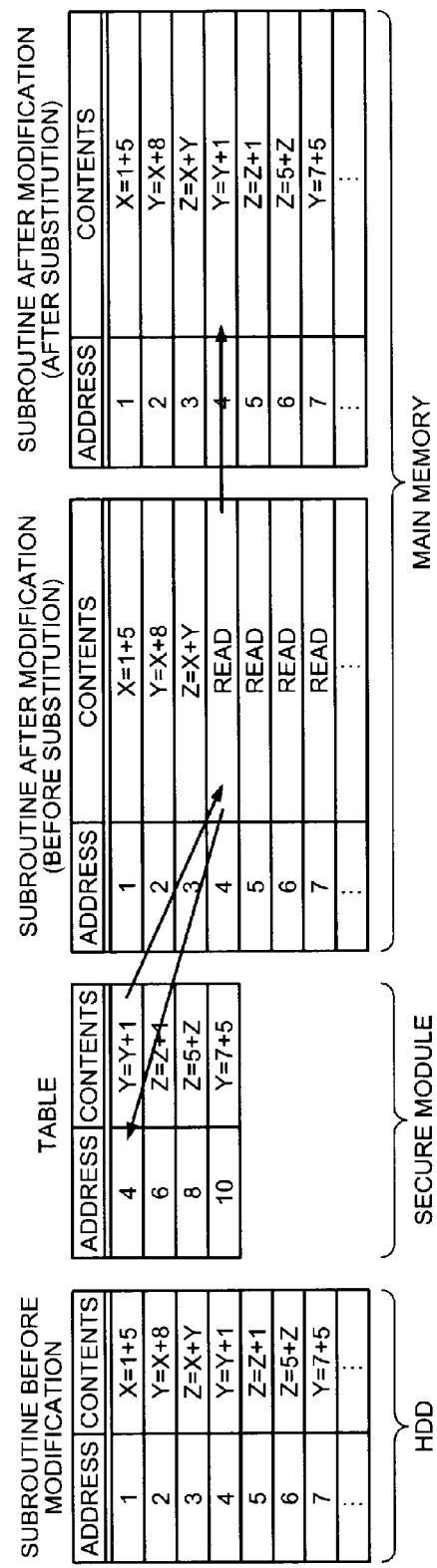

FIG. 13 is an example of encryption of a command group forming the subroutine SR. In FIG. 13, the secure module 102 substitutes the command groups at addresses 4 to 7 of the subroutine SR (before modification) with READ commands for the secure module 102. For example, the command "Y=Y+1" at address 4 is substituted with a READ command. At the subsequent address (address 5), a command is inserted instructing "write the command 'Y=Y+1' read out at address 4 from the secure module 102".

The secure module 102 retains in a table, the combination of the substituted command and the address thereof. For example, the secure module 102 retains the combination of address 4, which was subject to substitution, and the command "Y=Y+1" thereat.

The secure module 102 retains the table in the RAM 304 or the flash memory 306 and writes the modified subroutine SR to the main memory 103. When the subroutine SR (after modification) is executed, the processor 201 reads out the original command according to the substituted READ command and executes the subroutine SR. For example, according to the READ command at address 4, the processor 201 reads out the command "Y=Y+1" from the secure module 102 and executes the command.

Figure 14:
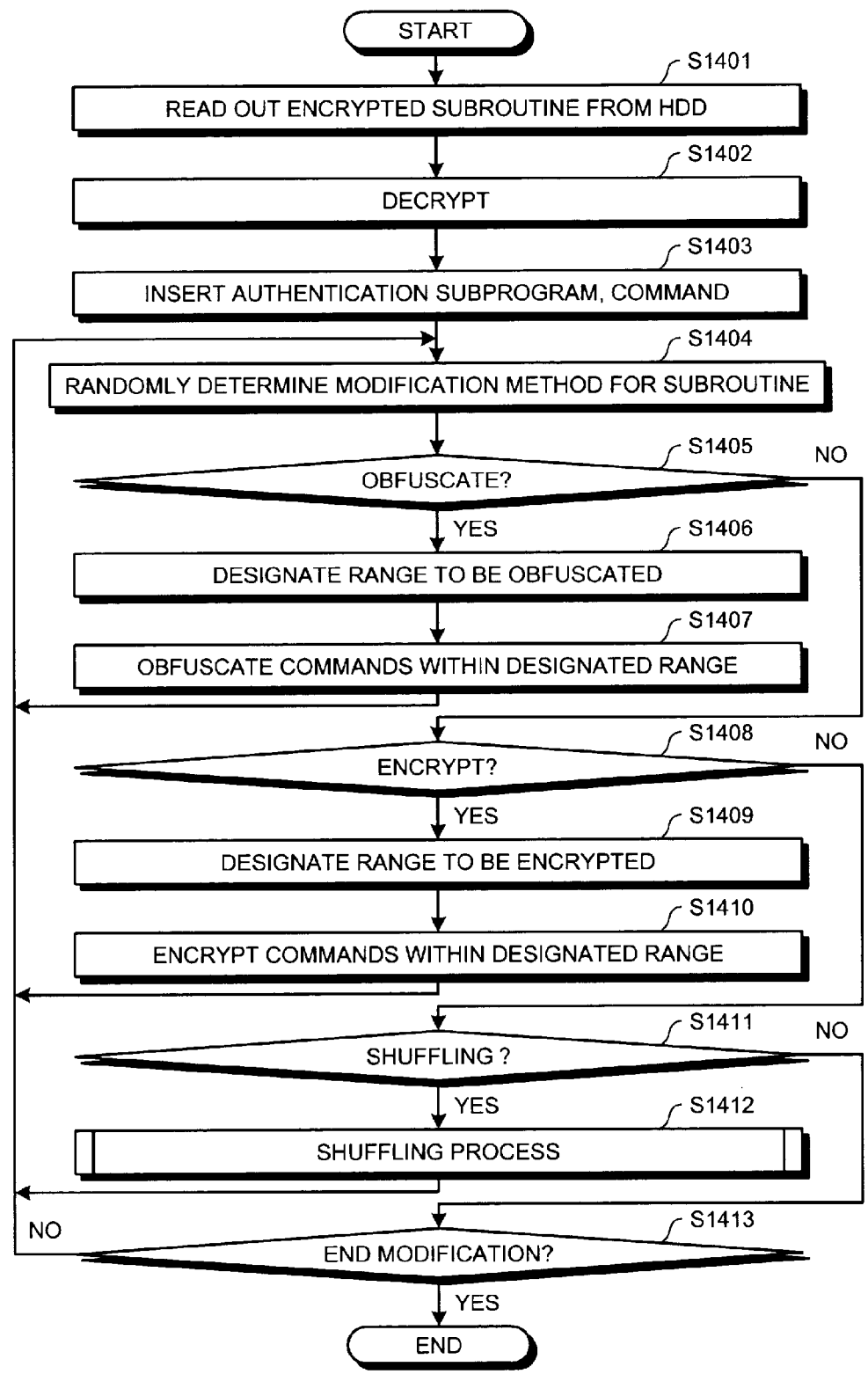
FIG. 14 is a flowchart of an example of a subroutine SR modification process.

FIG. 14 is a flowchart of an example of the subroutine SR modification process. The secure module 102 reads out the encrypted subroutine C-SR from the HDD 104 (step S1401), and decrypts the encrypted subroutine C-SR (step S1402).

Here, the secure module 102 inserts into the subroutine SR, an authentication subprogram or command (step S1403). The contents of the command will be described hereinafter with reference to FIGS. 18 and 19. The contents of the authentication subprogram will be described hereinafter with reference to FIG. 22.

The secure module 102 randomly determines the modification method for the subroutine SR (step S1404). For example, the secure module 102 determines the modification method from among "obfuscation", "encryption" (see FIGS. 12, 13), "shuffling" (see FIGS. 11, 12, 13), and "do nothing".

The secure module 102 determines whether the modification method is "obfuscation" (step S1405). If the modification method is "obfuscation" (step S1405: YES), the secure module 102 designates the range of the subroutine SR to be obfuscated (step S1406), obfuscates the commands within the designated range (step S1407), and returns to step S1404.

At step S1405, if the modification method is not "obfuscation" (step S1405: NO), the secure module 102 determines whether the modification method is "encryption" (step S1408). If the modification method is "encryption" (step S1408: YES), the secure module 102 designates the range of the subroutine SR to be encrypted (step S1409), and encrypts the commands within the designated range (step S1410). At this time, as depicted in FIG. 12, the secure module 102 stores to the table, the combination of the address to be subject to encryption and the decryption key that decrypts the encrypted command at the address. The secure module 102 returns to step S1404.

At step S1408, if the modification method is not "encryption" (step S1408: NO), the secure module 102 determines whether the modification method is "shuffling" (step S1411). If the modification method is "shuffling" (step S1411: YES), the secure module 102 executes shuffling (FIG. 15) (step S1412), and after the shuffling, returns to step S1404.

At step S1411, if the modification method is not "shuffling" (step S1411: NO), the secure module 102 determines whether modification has been ended (step S1413). In this example, since the modification method has been randomly determined to be "do nothing", if no modification has been performed, modification has not ended (step S1413: NO), in which case the secure module 102 returns to step S1404.

If modification has been performed at least once or modification has been performed a preliminarily set number of times, the secure module 102 randomly ends modification (step S1413: YES), thereby ending the modification process.

Figure 15:
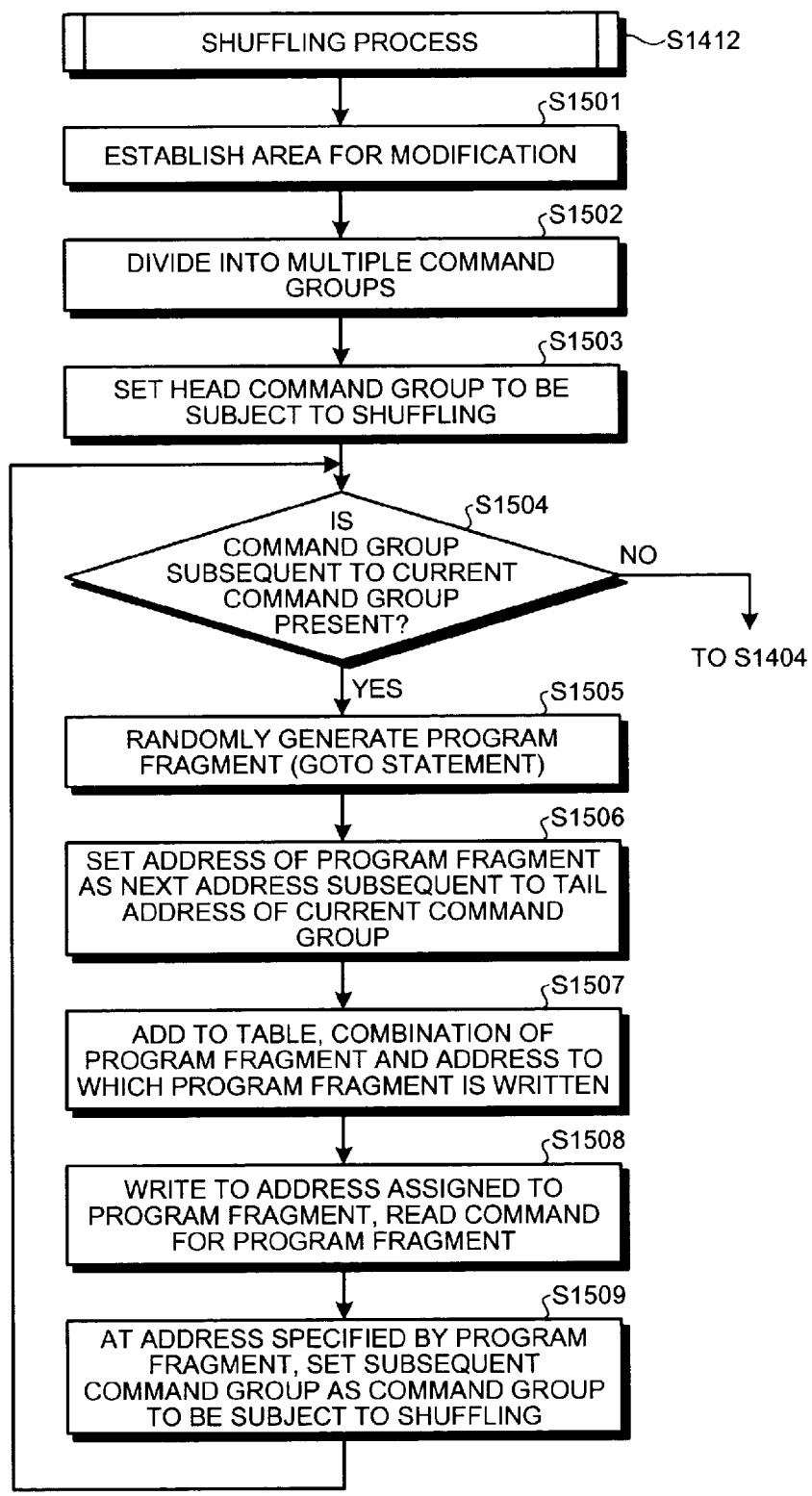
FIG. 15 is a flowchart of a shuffling process depicted in FIG. 14 (step S1412).

FIG. 15 is a flowchart of the shuffling process depicted in FIG. 14 (step S1412). Here, the shuffling depicted in FIG. 10 will be given as an example. The secure module 102 establishes in the secure module 102, an area for modification (step S1501), and divides the subroutine SR into multiple command groups (step S1502).

The secure module 102 sets the head command group as the command group to be subject to shuffling (step S1503). The secure module 102 determines whether a command group subsequent to the current command group is present (step S1504). If a subsequent command group is present (step S1504: YES), the secure module 102 randomly generates a program fragment (e.g., GOTO statement) (step S1505). For example, the secure module 102 generates the program fragment randomly and such that an area can be established into which the command group subject to shuffling can be stored.

Subsequently, the secure module 102 sets the address of the generated program fragment to be the next address subsequent to the tail address of the current command group (step S1506). The secure module 102 adds to the table, the combination of the program fragment and the address to which the program fragment is written (step S1507).

The secure module 102 writes to the address assigned to the program fragment of the subroutine SR, a READ command for the program fragment (step S1508). Thereafter, at the address specified by the program fragment (e.g., "8", if the program fragment is "Goto8"), the secure module 102 sets the subsequent command group as the command group to be subject to shuffling (step S1509), and returns to step S1504.

At step S1504, if no subsequent command group is present (step S1504: NO), the secure module 102 ends the shuffling process and returns to step S1404.

In this manner, the strength of security against cracking of the subroutine SR can be increased by modifying the subroutine SR. Any one of the modification methods described above is executed each time the encrypted subroutine SR is written and consequently, at each writing, the method of modifying the subroutine SR changes. Therefore, the analysis of the subroutine SR can be made more difficult for the cracker.

Figure 16A:
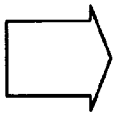
FIGS. 16A, 16B, and 16C are diagrams of examples of modification of the subroutine SR.
Figure 16B:
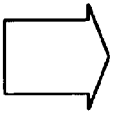
Figure 16C:
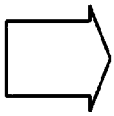

FIGS. 16A, 16B, and 16C are diagrams of examples of modification of the subroutine SR. FIG. 16A depicts an example in which the commands at addresses 1 to 4 of the subroutine SR are obfuscated and NOP is added at addresses 5 to 7. FIG. 16B depicts an example in which the commands at addresses 1 to 4 remain as is and commands are added at addresses 5 to 7, but the results are the same. FIG. 16C depicts an example in which the commands at addresses 1 to 4 remain as is and meaningless commands are added at addresses 5 to 7, whereby the results are the same.

In this manner, the subroutine SR on depicted on the left-hand side of FIGS. 16A to 16C are modified to those depicted on the right-hand side of FIGS. 16A to 16C. Consequently, the strength of security against cracking of the subroutine SR can be increased.

Figure 17:
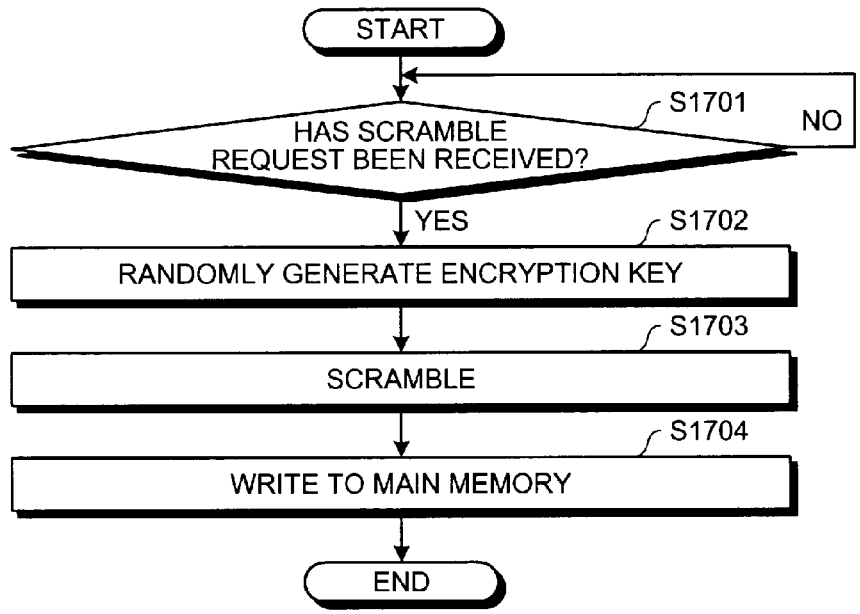
FIG. 17 is a flowchart of a scrambling process.

With reference to FIG. 17 a scrambling process of scrambling a program that is to be subject to encryption will be described. For example, the scrambling process is the scrambling process used to scramble the modified subroutine P-SR (the modified subroutine P-SR modified by the modifying program PP and depicted in FIGS. 9 to 16C) depicted at (4) in FIG. 8.

FIG. 17 is a flowchart of the scrambling process. The processor 301 determines whether a scramble request has been received from the information processing apparatus 101 (step S1701). Here, if no scramble request has been received (step S1701: NO), the processor 301 returns to step S1701 and waits for a scramble to be received.

On the other hand, if a scramble request has been received (step S1701: YES), the processor 301 randomly generates an encryption key (step S1702) and uses the generated encryption key to scramble the program to be subject to encryption (step S1703).

The processor 201 writes the scrambled program to the main memory 103 (step S1704), and ends the scrambling process. Thus, for each scrambling, a different encryption key is used, making program analysis by the cracker 105 difficult and preventing the development of malicious program.

Figure 18:
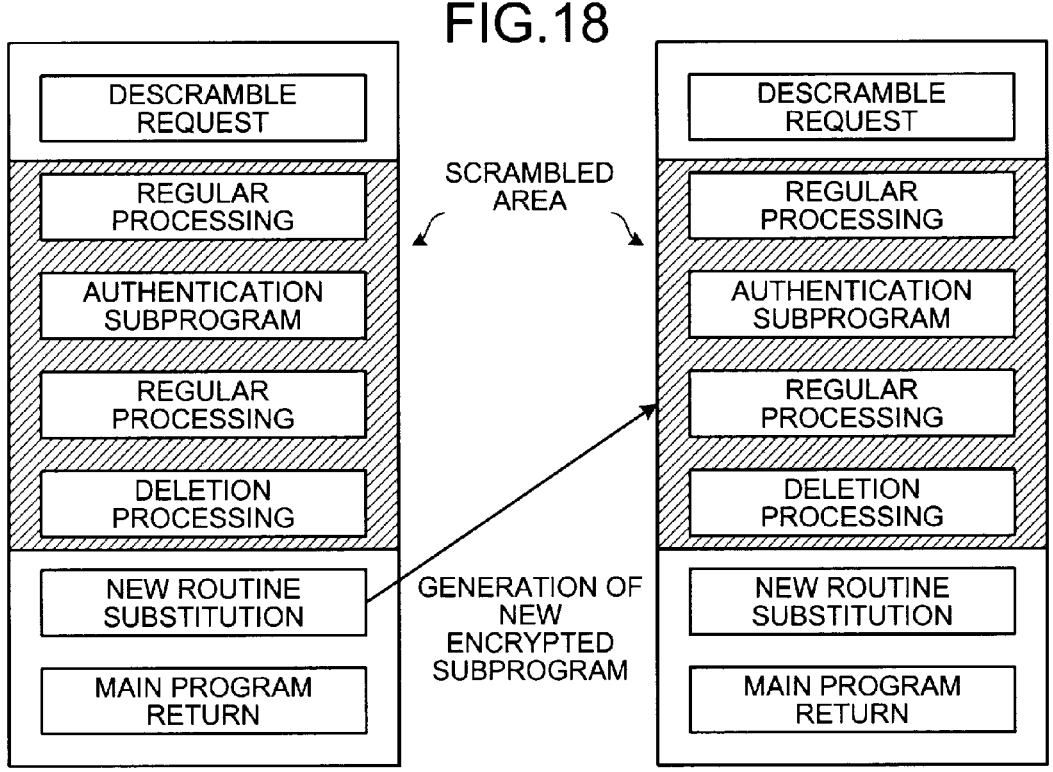
FIG. 18 is a diagram of a first example of the encrypted subroutine S-SR depicted in FIG. 8.
Figure 19:
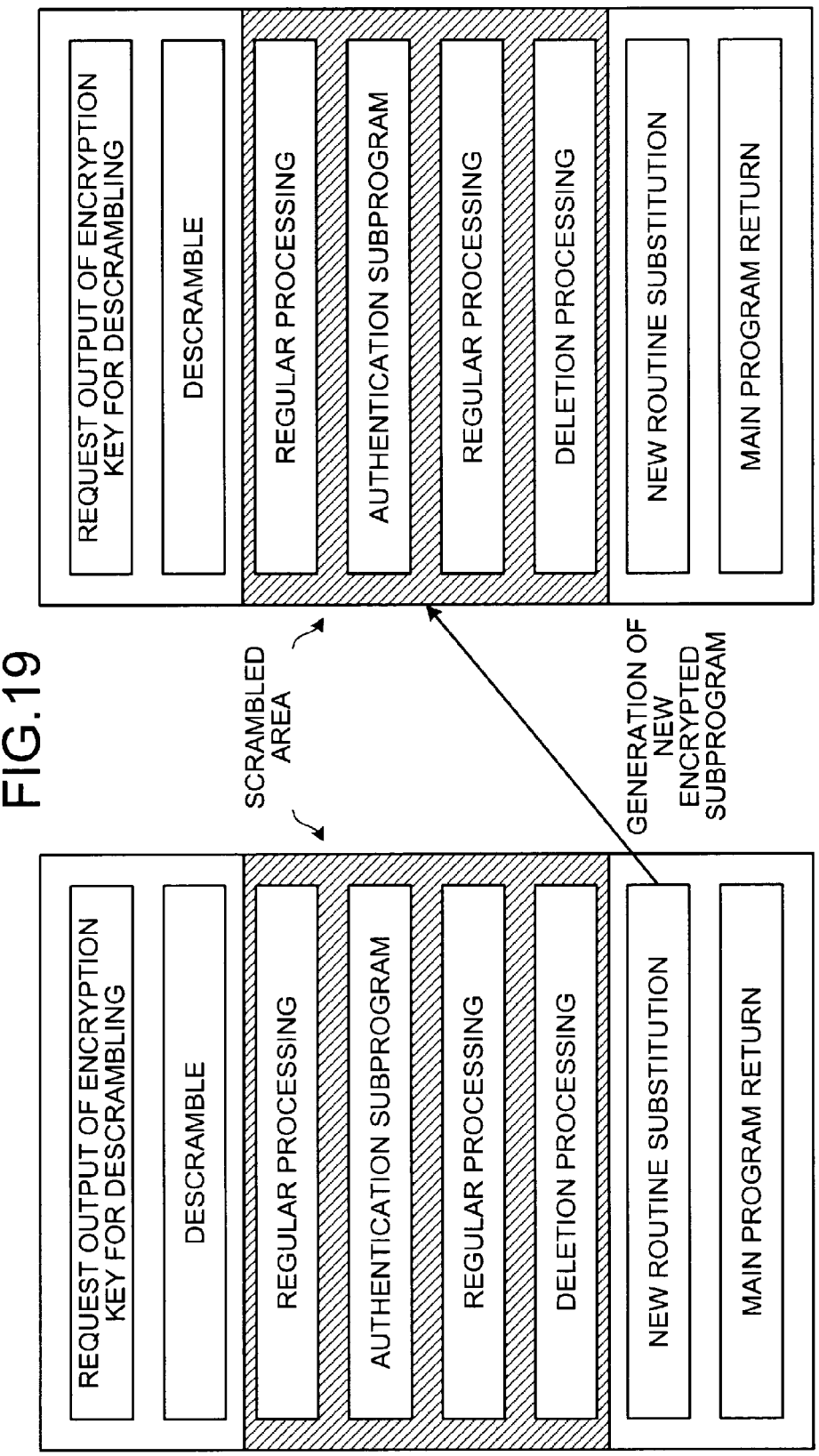
FIG. 19 is a diagram of a second example of the encrypted subroutine S-SR depicted in FIG. 8.

With reference to FIGS. 18 and 19, the contents of the encrypted subroutine S-SR depicted in FIG. 8 will be described. The encrypted subroutine S-SR depicted in FIG. 8 is, in other words, the encrypted subroutine S-SR scrambled by the scrambling process depicted in FIG. 17.

Here, in FIG. 18, the contents of the encrypted subroutine S-SR when the secure module 102 decrypts the encrypted subroutine S-SR will be described. On the other hand, in FIG. 19, the contents of the encrypted subroutine S-SR when the information processing apparatus 101, which has been provided an encryption key for decryption from the secure module 102, decrypts the encrypted subroutine S-SR will be described.

FIG. 18 is a diagram of a first example of the encrypted subroutine S-SR depicted in FIG. 8. At the head of the encrypted subroutine S-SR, an area, which has not been scrambled is present, and a command ("descramble request") requesting the secure module 102 to descramble the encrypted subroutine S-SR is included. The "descramble request" is a command inserted by the secure module 102 via the modifying program PP.

If the secure module 102 uses a different encryption key for each encryption, the "descramble request" inserted by the modifying program PP may include identification information corresponding to the encryption key used in the encryption. The secure module 102 refers to the identification information, identifies the encryption key, and performs descrambling.

In the encrypted subroutine S-SR, a scrambled area is present after the "descramble request" and a command ("regular processing") for performing regular processing by the encrypted software is included. Further, the "authentication subprogram" inserted by the secure module 102 via the modifying program PP is included between "regular processing" and "regular processing".

After the "regular processing", a command ("deletion processing") requesting the information processing apparatus 101 to delete the encrypted subroutine S-SR upon completion of execution thereof is included. The "deletion processing" is a command inserted by the secure module 102 via the modifying program PP.

Further, in the encrypted subroutine S-SR, an area that has not been scrambled is present after "deletion processing". In this area, a command ("new routine substitution") requesting the information processing apparatus 101 to newly generate the encrypted subroutine S-SR in place of the current encrypted subroutine S-SR is included. The "new routine substitution" is a command inserted by the secure module 102 via the modifying program PP.

Further, after "new routine substitution", a command ("main program return") to return to the main program is included. However, each of the commands inserted by the secure module 102 may be included in the subroutine SR from the beginning (i.e., at the time of development of the subroutine SR).

FIG. 19 is a diagram of a second example of the encrypted subroutine S-SR depicted in FIG. 8. In FIG. 19, the contents of "regular processing", "authentication subprogram", "deletion processing", "new routine substitution", and "main program return" are identical to those depicted in FIG. 18 and therefore, description thereof is omitted herein.

In FIG. 19, in place of the "descramble request" depicted in FIG. 18, "request output of encryption key for descrambling" and "descramble" are included in the head area that is not scrambled. The "request output of encryption key for descrambling" and "descramble" are commands inserted by the secure module 102 via the modifying program PP.

The "request output of encryption key for descrambling" is a command requesting the secure module 102 to provide the encryption key. If the secure module 102 uses a different encryption key for each encryption, "request output of encryption key for descrambling" inserted by the modifying program PP may include identification information corresponding to the encryption key used in the encryption. In this case, the secure module 102 is notified of the identification information and is requested to provide the encryption key.

"Descramble" is a command for the information processing apparatus 101 to use the provided encryption key and descramble the encrypted subroutine S-SR. However, each of the commands inserted by the secure module 102 may be included in the subroutine SR from the beginning (i.e., at the time of development of the subroutine SR).

Figure 20:
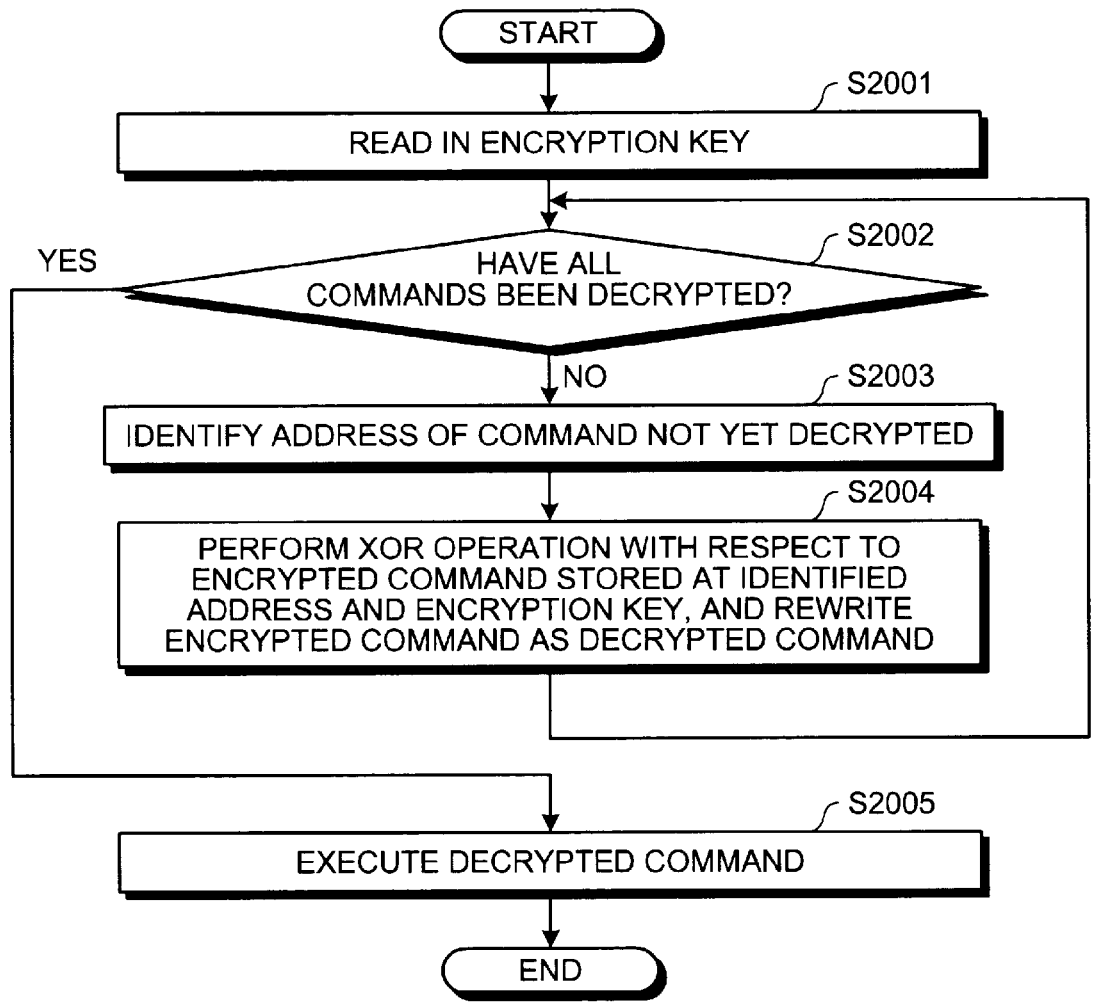
FIG. 20 is a flowchart of a descrambling process.

With reference to FIG. 20, a descrambling process of descrambling the encrypted subroutine S-SR depicted at (6) in FIG. 8 will be described. For example, the descrambling process is performed by the secure module 102, which has received a descramble request from the information processing apparatus 101 consequent to the "descramble request" command depicted in FIG. 18. Alternatively, the descrambling process is performed by the information processing apparatus 101, which executes the "descramble" command depicted in FIG. 19.

Here, as depicted in FIG. 19, an example in which the descrambling process is performed by the information processing apparatus 101 will be described.

FIG. 20 is a flowchart of the descrambling process. The processor 201 reads the encryption key (step S2001). The encryption key is, for example, provided by the secure module 102 and stored in the main memory 103.

The processor 201 determines whether all of the encrypted commands in the encrypted program subject to decryption and in the main memory 103 have been decrypted (step S2002).

If an encrypted command remains (step S2002: NO), the processor 201 identifies the address of the main memory 103 storing encrypted command (step S2003). The processor 201 performs an XOR operation with respect to the encrypted command stored at the identified address and the encryption key, and rewrites the encrypted command with the decrypted command (step S2004). Thereafter, the processor 201 returns to step S2002.

On the other hand, if all of the commands have been decrypted (step S2002: YES), the processor 201 executes the decrypted command group (step S2005), and ends the descrambling process. Thus, the encrypted program is put in an executable state.

An example of the program executing the descrambling process depicted in FIG. 20 will be described.

FIG. 21 is a diagram of an example of a program that executes the descrambling process. The subroutine SR (program) is a collection of command according address. Here, scrambled portions of the encrypted subroutine S-SR are assumed to reside at x5_address to x100_address of the main memory 103.

Here, if the secure module 102 performs descrambling, the descrambling program resides in the RAM 304 of the secure module 102. If the information processing apparatus 101 performs descrambling, the descrambling program resides in the main memory 103.

FIG. 21 depicts an example in which the information processing apparatus 101 uses an encryption key provided by the secure module 102 and performs descrambling. Further, the descrambling program is assumed to reside at 1_address to 8_address in the main memory 103.

Further, hereinafter, xx address is an encryption work area. An encrypted command is stored at an xx address. The command at xx address is descrambled and converted into a decrypted command. At an yy address the address number of the address of the work area is stored. At a zz address, an encryption key provided by the secure module 102 is stored.

For example, the command at 1_address is a command for the information processing apparatus 101 to read in the encryption key from the zz address storing the encryption key provided by the secure module 102. The command at 2_address is a command for the information processing apparatus 101 to store the address number "x4" to the yy address. The commands at 1_address and 2_address correspond to step S2001 depicted in FIG. 20.

The command at 3_address is a command for the information processing apparatus 101 to add 1 to the address number stored at the yy address. Here, the command at 4_address is a command for the information processing apparatus 101 to jump to x5_address and execute the command at x5_address, when the address number stored at the yy address exceeds "x100". In other words, after decryption up to x100_address has ended, the information processing apparatus 101 jumps to x5_address and executes the decrypted commands at x5_address to x100_address. The commands at 3_address and 4_address correspond to the fork at step S2002 depicted in FIG. 20.

The command at 5_address is a command for the information processing apparatus 101 to store to the xx address, the encrypted command indicated at the yy address. The command at 5_address corresponds to step S2003 depicted in FIG. 20.

The command at 6_address is a command for the information processing apparatus 101 to use the encryption key stored at the zz address to perform an XOR operation with respect to the encrypted command stored at the xx address and convert the encrypted command stored at the xx address into a decrypted command.

The command at 7_address is a command for the information processing apparatus 101 to overwrite the encrypted command stored at the address indicated by the address number stored at the yy address, with the decrypted command stored at the xx address. The commands at 6_address and 7_address correspond to step S2005 depicted in FIG. 20.

The command at 8_address is a command for the information processing apparatus 101 to return the address to be executed to 3_address and to recursively execute the commands at 3_address to 8_address until decryption of x100_address has ended. The program described above is one example of a program that executes the descrambling process depicted in FIG. 20.

Figure 22:
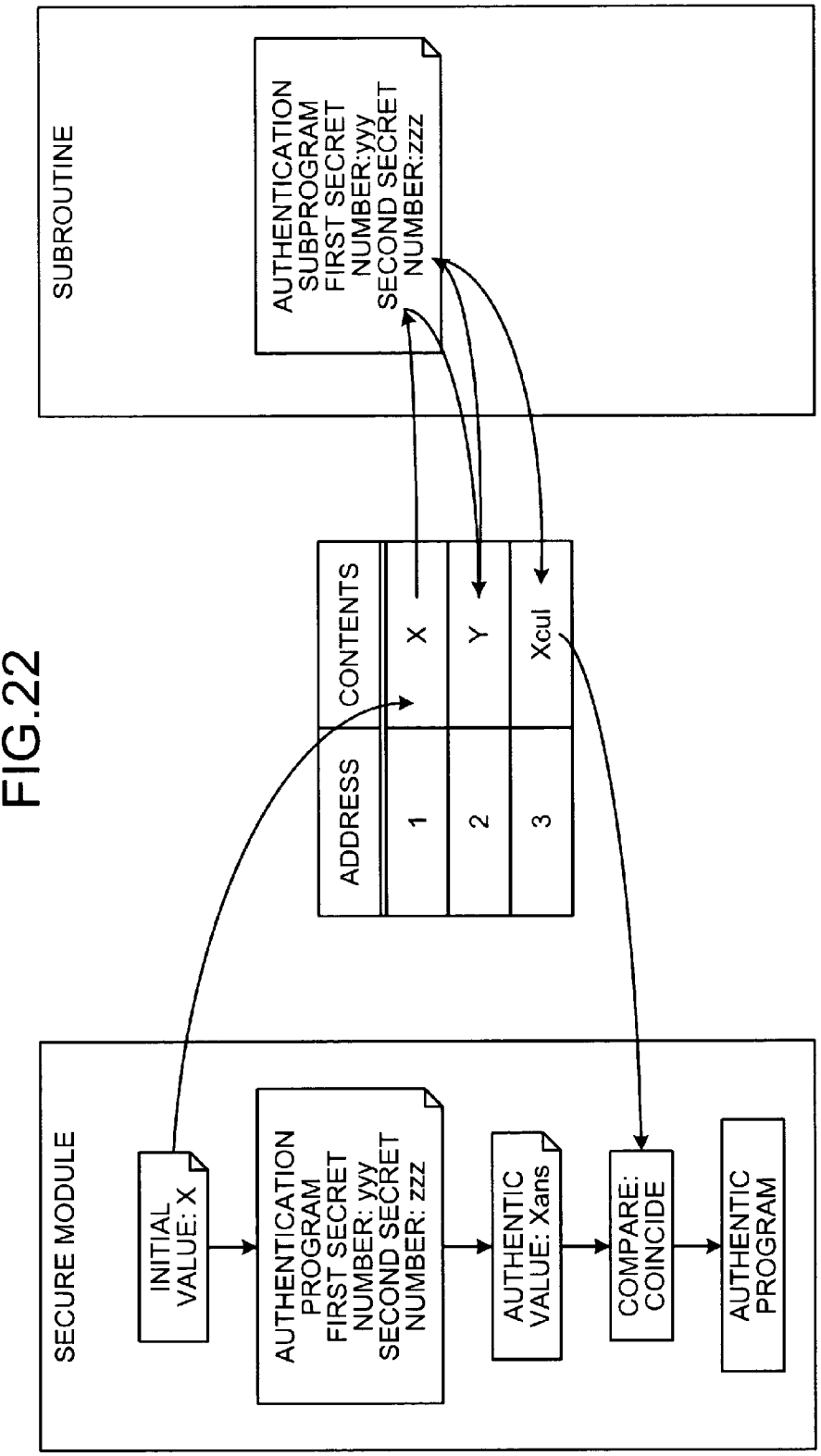
FIG. 22 is a diagram depicting an overview of authentication of the subroutine SR.
Figure 23:
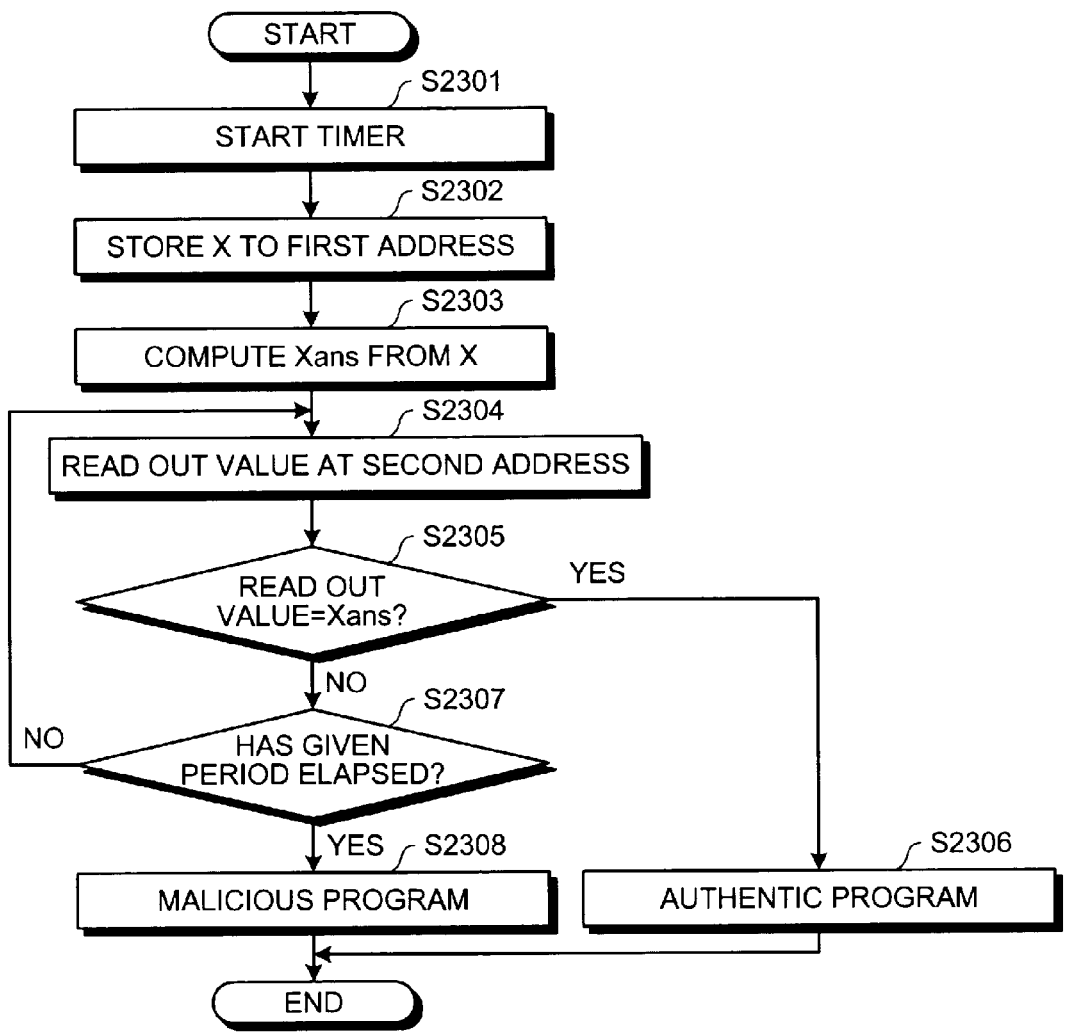
FIG. 23 is a flowchart of an authenticating process performed by the secure module 102.
Figure 24:
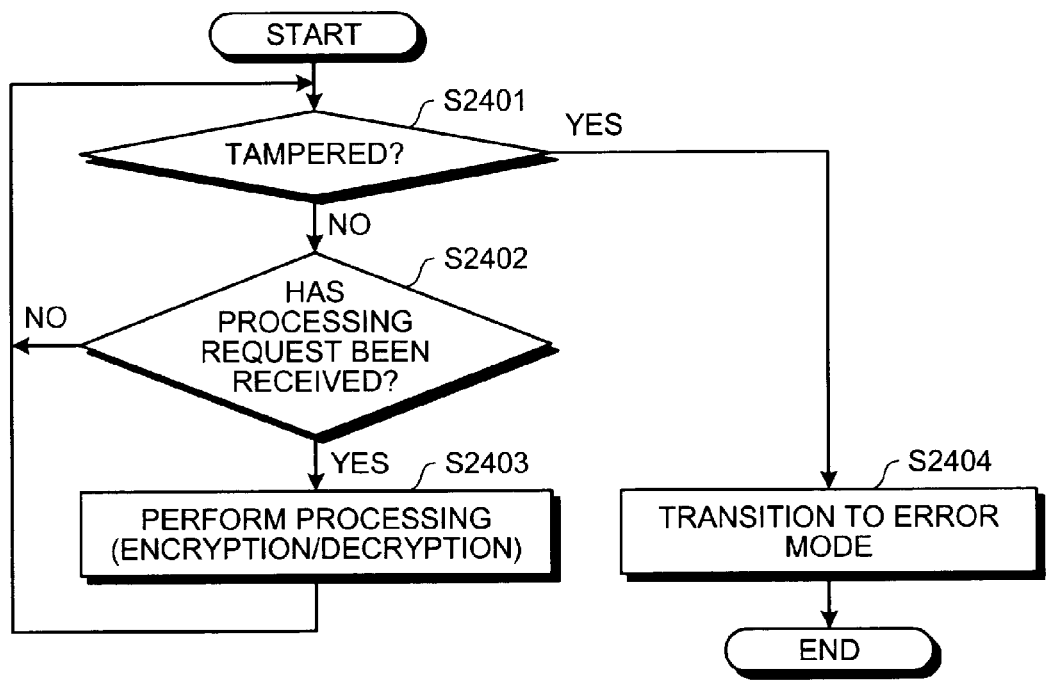
FIG. 24 is a flowchart of an encryption authorizing process performed by the secure module 102.

With reference to FIGS. 22 to 24, authentication of the subroutine SR depicted at (7) in FIG. 8 will be described. With reference to FIG. 22, an overview of authentication of the subroutine SR will be described.

FIG. 22 is a diagram depicting an overview of authentication of the subroutine SR. The authentication subprogram is a program that is inserted into the subroutine SR and that obtains a computation result based on a given computation. The secure module 102 has an authentication program that performs the same given computation as the authentication subprogram to obtain an authentic computation result. The secure module 102 further determines the authenticity of the subroutine SR based on whether the computation result of the authentication subprogram is the authentic computation result.

For example, the authentication subprogram stores to 2_address, the product of the value at 1_address and a first secret number "yyy" and stores to 3_address, the product of the value at 2_address and second secret number "zzz".

Here, the secure module 102 stores a randomly generated value "X" to 1_address. The secure module 102 executes the authentication program and computes from "X", the authentic value "Xans" that should be computed by the authentication subprogram.

On the other hand, the subroutine SR reads out "X" at 1_address; stores to 2_address, the product ("Y") of "X" and the first secret number "yyy"; and stores to 3_address, the product ("Xcul") of the value "Y" at 2_address and the second secret number "zzz".

The secure module 102 periodically refers to the value at 3_address, reads out the value "Xcul" at 3_address, and compares the read value with the authentic value "Xans". The secure module 102 determines the subroutine SR to be an authentic program, if "Xcul" and "Xans" coincide within a given period after storing "X" to 1_address. If "Xcul" and "Xans" do not coincide within the given period, the secure module 102 determines the subroutine SR to be a malicious program.

Thus, the secure module 102 can judge whether the subroutine SR is a malicious program resulting from tampering by the cracker 105. If the subroutine SR is a malicious program, the secure module 102 can terminate the execution of the malicious program, disable the encryption function and/or decryption function of the secure module 102, etc. to prevent damage consequent to the malicious program.

With reference to FIG. 23 the authenticating process depicted in FIG. 22 and performed by the secure module 102 using the authentication program will be described.

FIG. 23 is a flowchart of the authenticating process performed by the secure module 102. The secure module 102 starts a timer (step S2301). The secure module 102 stores a randomly generated value "X" to a first memory address (step S2302). The secure module 102 computes from "X", an authentic value "Xans" that should be computed by the authentication subprogram (step S2303).

The secure module 102 reads out the value at a second memory address (step S2304). The secure module 102 determines whether the read out value coincides with "Xans" (step S2305). If the read out value coincides with "Xans" (step S2305: YES), the secure module 102 determines the subroutine SR to be an authentic program (step S2306), and ends the authenticating process.

On the other hand, if the read out value does not coincide with "Xans" (step S2305: NO), the secure module 102 determines whether a given period has elapsed since the starting of the timer at step S2301 (step S2307), and if the given period has not elapsed (step S2307: NO), returns to step S2304.

On the other hand, of the given period has elapsed (step S2307: YES), the secure module 102 determines the subroutine SR to be a malicious program (step S2308), and ends the authenticating process. The contents of this authenticating process (authentication subprogram) may be modified to differ at each execution. By executing this modifying process each time an encrypted subroutine SR is read in, the authentication subprogram in the subroutine SR differs. Therefore, with respect to the authenticating process (authentication subprogram), analysis and camouflaging by a cracker can be made more difficult.

With reference to FIG. 24, an example of disabling the functions of the secure module 102 to prevent damage consequent to a malicious program when the subroutine SR is judged to be a malicious program in the authenticating process depicted in FIG. 23 will be described.

FIG. 24 is a flowchart of an encryption authorizing process performed by the secure module 102. The secure module 102 determines whether the subroutine SR has been tampered with (step S2401).

If the subroutine SR has not been tampered with (step S2401: NO), the secure module 102 determines whether a processing request has been received from the subroutine SR (step S2402).

If a processing request has been received (step S2402: YES), the secure module 102 performs processing according to the processing request from the subroutine SR (step S2403), and returns to step S2401. If no processing request has been received (step S2402: NO), the secure module 102 returns to step S2401.

On the other hand, if the subroutine SR has been tampered with (step S2401: YES), the secure module 102 transitions to an "error mode" (step S2404), and ends the encryption authorizing process. During the "error mode", provided that the subroutine SR is not restarted, the secure module 102 does not accept operations (encryption requests, decryption requests, etc.) from the subroutine SR.

Consequently, a malicious program can be prevent from requesting confidential information (encryption keys) inside the secure module 102, using the functions of the secure module 102, etc. As a result, damage consequent to a malicious program and incurred by the user of the information processing apparatus 101 can be prevented.

As described, at the secure module 102 for which authenticity is guaranteed, the information processing apparatus 101 encrypts a program that is to be written to the main memory 103 for which security is not guaranteed, and subsequently writes the encrypted program to the main memory 103. When the encrypted program is executed, the information processing apparatus 101 decrypts and executes the program. As a result, the information processing apparatus 101 reduces the time that the program in a nonencrypted state resides in the main memory 103, thereby preventing the analysis and tampering of the program by the cracker 105.

Further, the information processing apparatus 101 uses a different encrypting method for each encryption, thereby making program analysis by the cracker 105 difficult and enabling development of malicious programs to be prevented.

The information processing apparatus 101 performs encryption by an XOR operation with respect to encryption-key data and the program to be encrypted. As a result, when the encrypted program is executed, the time consumed for decryption of program can be reduced. Consequently, delay of the execution of the program consequent to decryption can be reduced.

The information processing apparatus 101 inserts an authentication subprogram into the program at the time of encryption, thereby enabling detection of program tampering, based on the authenticity of the computation result of the authentication subprogram.

In the case of tampering, the information processing apparatus 101 sets the secure module 102 to a state in which decryption of the encrypted program is disabled, notifies the user of the information processing apparatus 101 of the determination of tampering, etc. As a result, damage consequent to a malicious program can be prevented.

Further, by configuring the secure module 102 to perform decryption, the encryption keys, the encrypting methods, etc. are concealed, enabling increased security of the program. On the other hand, if configuration is such that the secure module 102 securely manages the encryption keys and decryption is performed by the information processing apparatus 101, functions of the secure module 102 can be omitted, enabling the secure module 102 to be produced more affordably.

Until a program enters the execution waiting state, the information processing apparatus 101 retains, in the HDD 104, the program encrypted by an encrypting method of a high cipher strength, thereby enabling security of the program to be guaranteed.

The information processing apparatus 101 modifies the program by "obfuscation", "encryption", and "shuffling", thereby making analysis of the program by the cracker 105 difficult and enabling the development of malicious programs to be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus securely storing a program group comprising one or more programs, the information processing apparatus comprising:
    a first detector that detects an execution waiting state of a given program among the program group;
    a secure module comprising a processor and an encryption circuit and that is configured such that information stored therein cannot be referred to by an external device, and when the execution waiting state is detected by the first detector, that the encryption circuit encrypts the given program and the processor writes the encrypted given program to a storage area that is different from that of the program group;
    a second detector that detects an execution request concerning the given program;
    a decrypter that decrypts the given program encrypted by the secure module and writes the decrypted given program to the storage area, when the execution request concerning the given program is detected by the second detector;
    a program executor that executes the given program decrypted by the decrypter; and
    a storage device that retains therein an encrypted program group which is the program group encrypted, wherein
    the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

2. The information processing apparatus according to claim 1, wherein the secure module uses a different encrypting method for each encryption.

3. The information processing apparatus according to claim 2, wherein the secure module uses a different encryption key for each encryption.

4. The information processing apparatus according to claim 1, wherein
    the secure module performs encryption by an XOR operation with respect to encryption-key data and the given program to be encrypted.

5. The information processing apparatus according to claim 1, wherein the secure module comprises:
    an inserter that prior to encryption, inserts into the given program, a computing program that performs a given computation and writes an obtained computation result to a given area of the storage area,
    a determiner that determines that the given program has been tampered with, when accompanying execution of the given program by the program executor, the computation result written by the computing program and the computation result obtained by performing the given computation at the secure module do not coincide, and
    an output device that outputs a determination result when tampering has been determined by the determiner.

6. The information processing according to claim 5 apparatus, further comprising a disabler that sets the decrypter to a disabled state when tampering has been determined by the determiner.

7. The information processing apparatus according to claim 1, further comprising a program deleter that deletes from the storage area, the given program for which execution by the program executor has been completed.

8. The information processing apparatus according to claim 1, wherein
the decrypter resides outside of the secure module and uses an encryption key that is provided by the secure module and used by the secure module in the encryption of the given program, to decrypt the given program.

9. The information processing apparatus according to claim 1, wherein
the decrypter resides in the secure module.

10. The information processing apparatus according to claim 1, wherein
the secure module, prior to encryption, obfuscates a command of the given program.

11. The information processing apparatus according to claim 1, wherein
the secure module, prior to encryption, shuffles a command group of the given program, stores a table that indicates a combination of a jump command specifying an address of a command to be jumped to and the address of the jump command, and changes contents of the jump command, which is in the given program after shuffling, to a read command instructing reading of the table.

12. The information processing apparatus according to claim 1, wherein
the secure module, prior to encryption, shuffles a command group of the given program, stores a table that indicates a combination of an address of a given command and commands corresponding thereto including the given command and a jump command specifying an address of a command to be jumped to, and changes contents of the given command in the given program after shuffling, to a read command instructing reading of the table.

13. The information processing apparatus according to claim 1, wherein
the secure module, prior to encryption, substitutes a given command in the given program with an encrypted command that is the given command encrypted, a read command for the secure module, and a decryption command instructing decryption of the encrypted command; and stores a table that indicates a combination of an address of the read command and a decryption key that decrypts the encrypted command.

14. The information processing apparatus according to claim 1, wherein the secure module, prior to encryption, substitutes a given command of the given program with a read command for the secure module and stores a table that indicates a combination of an address of the read command and the given command.

15. A secure module configured such that information stored therein cannot be referred to by an external device, and disposed in an information processing apparatus, which has a first storage area and a second storage area that securely stores therein a program group comprising one or more programs and which executes a program in the first storage area, the secure module comprising a processor and an encryption circuit and configured to execute:
an encrypter that encrypts encrypting, by the encryption circuit, a given program among the program group and writes writing, by the processor, the encrypted given program to the first storage area, when an execution waiting state of the given program has been detected; and
a decrypter that decrypts the encrypted given program and writes the decrypted given program to the first storage area, when an execution request concerning the given program has been detected; and
a storage device that retains therein an encrypted program group which is the program group encrypted, wherein
the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

16. An information processing method executed by an information processing apparatus comprising a secure module configured such that information stored therein cannot be referred to by an external device and storing securely a program group comprising one or more programs, the information method comprising:
detecting an execution waiting state of a given program among the program group;
encrypting the given program and writing the encrypted given program to a storage area that is different from that of the program group, the encrypting and writing being performed by the secure module and when the execution waiting state is detected;
detecting an execution request concerning the given program;
decrypting the encrypted given program and writing the decrypted given program to the storage area, the decrypting and writing being performed by the secure module and when the execution request concerning the given program is detected; and
executing the decrypted given program; and
retaining an encrypted program group which is the program group encrypted, wherein
the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

17. An information processing method performed by a secure module that is configured such that information stored therein cannot be referred to by an external device, and is disposed in an information processing apparatus having a first storage area and a second storage area that securely stores therein a program group comprising one or more programs, and the information processing apparatus executing a program in the first storage area, the information processing method comprising:
encrypting a given program among the program group and writing the encrypted given program to the first storage area, when an execution waiting state of the given program is detected; and
decrypting the encrypted given program and writing the decrypted given program to the first storage area, when an execution request concerning the given program is detected; and
retaining an encrypted program group which is the program group encrypted, wherein
the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

18. A non-transitory computer-readable medium storing therein an information processing program that causes an information processing apparatus to execute a process, the information processing apparatus comprising a secure module configured such that information stored therein cannot be referred to by an external device and storing securely a program group comprising one or more programs, the process comprising:
    detecting an execution waiting state of a given program among the program group;
    encrypting the given program and writing the encrypted given program to a storage area that is different from that of the program group, the encrypting and writing being performed by the secure module and when the execution waiting state is detected;
    detecting an execution request concerning the given program;
    decrypting the encrypted given program and writing the decrypted given program to the storage area, the decrypting and writing being performed by the secure module and when the execution request concerning the given program is detected; and
    executing the decrypted given program; and
    retaining an encrypted program group which is the program group encrypted, wherein
    the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

19. A non-transitory computer-readable medium storing therein an information processing program that causes a processor to execute a process, the processor being in a secure module that is configured such that information stored therein cannot be referred to by an external device, and is disposed in an information processing apparatus having a first storage area and a second storage area that securely stores therein a program group comprising one or more programs, and the information processing apparatus executing a program in the first storage area, the process comprising:
    encrypting a given program among the program group and writing the encrypted given program to the first storage area, when an execution waiting state of the given program is detected; and
    decrypting the encrypted given program and writing the decrypted given program to the first storage area, when an execution request concerning the given program is detected; and
    retaining an encrypted program group which is the program group encrypted, wherein
    the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

20. An information processing apparatus securely storing a program group comprising one or more programs, the information processing apparatus comprising:
    a first detector that detects an execution waiting state of a given program among the program group;
    a secure module comprising a hardware processor and that is configured such that information stored therein cannot be referred to by an external device, and when the execution waiting state is detected by the first detector, the processor encrypts the given program and the processor writes the encrypted given program to a storage area that is different from that of the program group;
    a second detector that detects an execution request concerning the given program;
    a decrypter that decrypts the given program encrypted by the secure module and writes the decrypted given program to the storage area, when the execution request concerning the given program is detected by the second detector; and
    a program executor that executes the given program decrypted by the decrypter; and
    a storage device that retains therein an encrypted program group which is the program group encrypted, wherein
    the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

21. A secure module configured such that information stored therein cannot be referred to by an external device, and disposed in an information processing apparatus, which has a first storage area and a second storage area that securely stores therein a program group comprising one or more programs and which executes a program in the first storage area, the secure module comprising a hardware processor configured to execute:
    encrypting, by the processor, a given program among the program group and writing, by the processor, the encrypted given program to the first storage area, when an execution waiting state of the given program has been detected; and
    a decrypter that decrypts the encrypted given program and writes the decrypted given program to the first storage area, when an execution request concerning the given program has been detected; and
    a storage device that retains therein an encrypted program group which is the program group encrypted, wherein
    the secure module, when the program group is called, decrypts the encrypted program group, which has been encrypted by a first encrypting method, encrypts the resulting decrypted program group by a second encrypting method that differs from the first encrypting method, and writes the resulting encrypted program group to the storage area.

\* \* \* \* \*